US012559629B2

(12) United States Patent
Lutzke et al.

(10) Patent No.: US 12,559,629 B2
(45) Date of Patent: Feb. 24, 2026

(54) METHOD FOR PREPARING A STABLE TRYPAN BLUE SOLUTION

(71) Applicant: BECKMAN COULTER, INC., Brea, CA (US)

(72) Inventors: Alec Lutzke, Fort Collins, CO (US); Blake R. Mccarty, Loveland, CO (US)

(73) Assignee: BECKMAN COULTER, INC., Brea, CA (US)

(*) Notice: Subject to any disclaimer, the term of this patent is extended or adjusted under 35 U.S.C. 154(b) by 334 days.

(21) Appl. No.: 18/255,761

(22) PCT Filed: Dec. 3, 2021

(86) PCT No.: PCT/US2021/061835
§ 371 (c)(1),
(2) Date: Jun. 2, 2023

(87) PCT Pub. No.: WO2022/120188
PCT Pub. Date: Jun. 9, 2022

(65) Prior Publication Data
US 2024/0059898 A1 Feb. 22, 2024

Related U.S. Application Data

(60) Provisional application No. 63/120,957, filed on Dec. 3, 2020.

(51) Int. Cl.
*A61K 49/00* (2006.01)
*C09B 35/029* (2006.01)
*C09B 67/44* (2006.01)

(52) U.S. Cl.
CPC ........ *C09B 67/0083* (2013.01); *C09B 35/029* (2013.01)

(58) Field of Classification Search
CPC .......................... C09B 67/0083; C09B 35/029
(Continued)

(56) References Cited

U.S. PATENT DOCUMENTS 7,294,154 B2 * 11/2007 Nashimoto .............. G01N 1/30 8/664
2004/0023401 A1 * 2/2004 Choi .................. G01N 33/6839 436/166
(Continued)

FOREIGN PATENT DOCUMENTS

CN 102892433 A 1/2013
CN 102952824 A 3/2013
(Continued)

OTHER PUBLICATIONS

The Prepation and teratogenic—Properties of Pue Pluepan-Blue Dated Mar. 1963.*
(Continued)

*Primary Examiner* — Eisa B Elhilo
(74) *Attorney, Agent, or Firm* — Merchant & Gould P.C.

(57) ABSTRACT

Compositions, methods, and kits for stable Trypan Blue solutions are provided. In one example, a method includes: cooling a solution of Trypan Blue; and filtering the cooled solution. In another example, a method includes: mixing a water-soluble polymer with a Trypan Blue solution. The method may further include adding one or more ingredients such as an aqueous buffer, an osmolyte, an acid, a base, a buffer, a cell culture medium, water, or combinations thereof.

19 Claims, 9 Drawing Sheets

(58) Field of Classification Search
USPC .................................. 8/636, 637.1, 641, 642
See application file for complete search history.

(56) References Cited

U.S. PATENT DOCUMENTS

| | | | | |
|---|---|---|---|---|
| 2012/0309671 | A1 | 12/2012 | Klinger | |
| 2020/0093941 | A1 * | 3/2020 | Melles | .................... A61P 41/00 |

FOREIGN PATENT DOCUMENTS

| | | | | |
|---|---|---|---|---|
| CN | 107847432 | A | 3/2018 | |
| CN | 109055302 | A | 12/2018 | |
| CN | 111991620 | A | 11/2020 | |
| WO | WO 2018007457 | A1 * | 1/2018 | ........... A61K 49/006 |
| WO | 2018/217088 | | 11/2018 | |

OTHER PUBLICATIONS

Costa, Elaine et al., "Effects of Light Exposure, pH, Osmolarity, and Solvent on the Retinal Pigment Epithelial Toxicity of Vital Dyes", American Journal of Opthalmology, Elsevier, vol. 155, No. 4, Dec. 17, 2012, p. 705-712.

Katano et al., "Colorimetric Microtiter Plate Assay of Polycationic Aminoglycoside Antibiotics in Culture Broth Using Amaranth", Analytical Sciences, Apr. 2017, vol. 33, 499-504.

Maruthamuthu et al., "Spectral Studies on the Cooperative Binding Mechanism of Evans Blue to Poly(N-vinyl-2-pyrrolidone)", Bull. Chem. Soc. Jpn., 1989, 62, 295-303.

PCT International Preliminary Report on Patentability in Application PCT/US2021/061835, mailed Jun. 15, 2023, 11 pages.

PCT International Search Report and Written Opinion in Application PCT/US2021/061835, mailed Jun. 27, 2022, 17 pages.

Walther, Cornelia, et al., "Specific labeling with potent radiolabels alters the uptake of cell-penetrating peptides", Biopolymers, Wiley, vol. 92, No. 5, Apr. 27, 2009, pp. 445-451.

Yamaji, Hideki et al., "Growth and death behavior of anchorage-independent animal cells immobilized within porous support matrices", Applied Microbiology and Biotechnology, Springer-Verlag, vol. 37, 20. 2, May 1, 1992, pp. 244-251.

European Office Action for Application No. 21836693.8 mailed Sep. 15, 2025.

Kamiloglu et al., "Guidelines for cell viability assays," Food Frontiers, vol. 1, pp. 332-349 (2020).

* cited by examiner

A    Trypan blue in deionized water

B    Trypan blue in PBS buffer

C    Trypan blue in Cell Medium 1

D    Trypan blue in Cell Medium 3

E    Trypan blue in Cell Medium 2

F    Trypan blue in Cell Medium 4

METHOD FOR PREPARING A STABLE TRYPAN BLUE SOLUTION

CROSS-REFERENCE TO RELATED APPLICATIONS

This application is a National Stage Application of PCT International Patent Application Ser. No. PCT/US2021/061835, filed Dec. 3, 2021, and claims the benefit of, and claims priority to, U.S. Provisional Patent Application Ser. No. 63/120,957, filed Dec. 3, 2020, the entire contents of which are hereby incorporated by reference in their entirety. To the extent appropriate, a claim of priority is made to each of the above-disclosed applications.

INTRODUCTION

The present disclosure generally relates to solutions containing Trypan Blue, kits and methods of making Trypan Blue solutions, methods for stabilizing Trypan Blue solutions, and methods of using Trypan Blue solutions.

Trypan Blue is an azo dye with a wide range of application from textiles to biosciences. Trypan Blue is commonly used to determine cell viability in dye exclusion testing. When Trypan Blue is used in dye exclusion testing, cells with intact cell membranes exclude the Trypan Blue dye and are not stained. This unstained condition is considered to be indicative of cell viability. In contrast, cells with compromised cell membranes permit dye uptake and are stained blue. This stained condition is considered to be indicative of cell non-viability. The ratio of unstained cells to total cells may be used to calculate the percentage of viable cells within a given sample.

Discrimination between stained and unstained cells is typically achieved through visual inspection and enumeration using an optical microscope and manual cell counting devices such as a hemocytometer. In addition, analytical instruments are available that automatically enumerate and discriminate between stained and unstained cells using imaging devices and image processing algorithms.

Because enumeration and discrimination between stained and unstained cells is based on visual inspection or imaging processing, it is important that the dye solution used for dye exclusion testing remain largely free of particulates and other debris that may interfere with identification of cells.

Trypan Blue in phosphate-buffered saline (PBS) is a solution of the Trypan Blue dissolved in PBS and preserved with sodium azide.

Dye aggregation describes the phenomenon of self-association among dissolved dye molecules. Significant self-association may cause the dye to precipitate from solution in the form of insoluble aggregates containing many dye molecules. This self-association is mediated by various attractive intermolecular forces, including hydrogen bonding, electrostatic interaction, van der Waals forces, and 71-stacking.

Other chemicals present in the dye buffer solution influence the interactions between dye molecules. These influences may increase or decrease the likelihood of dye aggregation. Sodium chloride is added to dye buffer to ensure osmotic balance; in the absence of this dissolved salt, the resulting hypotonic buffer would promote cell osmolysis and be unsuitable for use in dye exclusion testing for cell viability.

Trypan Blue dye commonly contains organic impurities. A red colored impurity occurs in Trypan Blue that is poorly soluble in PBS and forms filamentous or fiber-like red dye aggregates, as shown in FIG. 1. Scientific literature has previously described the formation of this red impurity during synthesis of Trypan Blue and structural analogs thereof (see *Organic Syntheses* 1936, 16, 12; DOI 10.15227/orgsyn.016.0012). Trypan Blue and the red impurity are visually distinct when separately dissolved in solution.

The cosmetic appearance of the dye solution is commonly impaired by the presence of impurity aggregates. These impurity aggregates can be confused with biological contamination or debris and otherwise impact the perceived quality of the dye solution product and may be interpreted incorrectly.

If Trypan Blue contains a significant amount of dye aggregates, further filtration or heating may be required to remove or re-dissolve the dye aggregates. Filtration or heating may be impractical and these methods do not prevent future reoccurrences of dye aggregation or precipitation at storage temperatures, typically at or near ambient laboratory temperature. Hence, there is a need for stable Trypan Blue solutions with reduced or no aggregates.

SUMMARY

In one aspect, the present disclosure provides a Trypan Blue solution. In one example, a Trypan Blue solution comprises: Trypan Blue, an osmolyte, and an aqueous buffer.

In some embodiments, the Trypan Blue solution may have a concentration of Trypan Blue from about 0.01% to about 2%, based on the total weight (in the unit of w/w %) or total volume (in the unit w/v %) of the Trypan Blue solution. The buffer may be a sodium azide preserved PBS buffer.

In some embodiments, the osmolyte is not a sodium salt. In some embodiments, the osmolyte is selected from the group consisting of: lithium chloride, D-glucose, L-glycine, or combinations thereof.

In some embodiments, the Trypan Blue solution further comprises an acid or a base. the acid may comprise phosphoric acid. The base may comprise alkali hydroxide.

In some embodiments, the Trypan Blue solution further comprises a water-soluble polymer. The water-soluble polymer may comprise an anionic polymer or a non-ionic polymer or both. In some embodiments, the water-soluble polymer comprises a polymer selected from the group of: poly(acrylic acid) or a salt thereof, poly(styrene sulfonate) or a salt thereof, poly(vinyl pyrrolidone), or any combinations thereof. In some embodiments, the water-soluble polymer is a poly(acrylic acid) or an alkali salt thereof with an average molecular weight from about 4,000 to about 6,000 g/mol. In some embodiments, the water-soluble polymer is a poly(4-styrene sulfonate) or an alkali salt thereof with an average molecular weight from about 50,000 to about 80,000 g/mol. In some embodiments, the water-soluble polymer is a poly(vinyl pyrrolidone) with an average molecular weight from about 30,000 to about 50,000 g/mol.

In some embodiments, the Trypan Blue solution has a concentration of water-soluble polymer from about 0.05% to about 4%, based on the total weight (w/w %) or total volume (w/v %) of the Trypan Blue solution. In some embodiments, the Trypan Blue solution has a repeating unit concentration of the water-soluble polymer from about 5 mmol/L to about 500 mmol/L. In some embodiments, the Trypan Blue solution has a molar ratio of repeating unit of the water-soluble polymer to Trypan Blue from about 1 to about 55.

In some embodiments, the Trypan Blue solution has a pH from about from about 7.0 to about 7.5. In some embodiments, the Trypan Blue solution has an osmolality from about 270 to about 310 mOsm $kg^{-1}$.

The Trypan Blue solution is free or substantially free of precipitated impurities after storing for at least about 10 minutes at ambient temperature from about 15° C. to about 30° C.

In another example, a Trypan Blue solution comprises: Trypan Blue and a water-soluble polymer described herein. In some embodiments, the Trypan Blue solution further comprises at least one of: an aqueous buffer, an osmolyte, an acid, a base, a cell culture medium, or any combinations thereof, in accordance with the present disclosure.

In another aspect, the present disclosure provides a method. The method may be used for at least one of: preparing a Trypan Blue solution, stabilizing a Trypan Blue solution, purifying a Trypan Blue solution, using a Trypan Blue solution, or any combinations thereof.

In one example, a method comprises: providing a solution of Trypan Blue; and adding a water-soluble polymer described herein to the solution of Trypan Blue. In some embodiments, the method further comprises adjusting Trypan Blue concentration to a range from about 0.01% to about 2%, based on the total weight (in the unit of w/w %) or total volume (in the unit w/v %) of the Trypan Blue solution. In some embodiments, the method further comprises adjusting a molar ratio of repeating unit of the water-soluble polymer to Trypan Blue from about 1 to about 55.

In some embodiments, the method further comprises filtering the Trypan Blue solution before, or after adding the water-soluble polymer. In some embodiments, the filtration is performed through use of at least one filtration medium with an average pore size of about 0.2 μm.

In some embodiments, the method comprises cooling the Trypan Blue solution before the filtration step. In some embodiments, the cooling step is performed before, after, or before and after adding the water-soluble polymer. In some embodiments, the Trypan Blue solution is cooled to a temperature of about 0° C. to about 14° C. In some embodiments, the Trypan Blue solution is cooled for at least about 1 hour.

In some embodiments, the method comprises mixing Trypan Blue with at least one ingredient selected from: an osmolyte, an acid, a base, a pH modifier, a buffer solution, a cell culture medium, water, or any combinations thereof.

In some embodiments, the method comprises adjusting the pH of the Trypan Blue solution to a range from about 6.5 to about 8. In some embodiments, the method comprises adjusting the pH of the Trypan Blue solution to about 6 to about 7 before or during the cooling step. In some embodiments, the method comprises adjusting the pH of the Trypan Blue solution to about 7 to about 7.5 after the filtration step. In some embodiments, the method comprises adjusting osmolality of the Trypan Blue solution to a range from about 270 to about 310 mOsm $kg^{-1}$. In some embodiments, the method comprises repeating the cooling and/or the filtration step. In some embodiments, the method comprises packaging the filtered Trypan Blue solution.

In another example, a method comprises cooling a solution of Trypan Blue; and filtering the cooled solution. In some embodiments, the method further comprises mixing the solution of Trypan Blue with one or more ingredients selected from: an osmolyte, an acid, a base, a pH modifier, a cell culture medium, water, or any combinations thereof.

In some embodiments, the stable Trypan Blue solution has a concentration of Trypan Blue from about 0.01% to about 2%, based on the total weight (in the unit of w/w %) or total volume (in the unit w/v %) of the Trypan Blue solution.

In some embodiments, the osmolyte is not a sodium salt. In some embodiments, the osmolyte is selected from the group consisting of: lithium chloride, D-glucose, L-glycine, or combinations thereof.

In some embodiments, the Trypan Blue is at a concentration near, at, or beyond the solubility limit in the solution prior to cooling. In some embodiments, the solution of Trypan Blue is made by mixing Trypan Blue with an aqueous buffer at ambient or near-ambient temperature and pressure prior to cooling.

In some embodiments, the method further comprises mixing a water-soluble polymer described herein with the solution of Trypan Blue before cooling or after filtration. In some embodiments, the method further comprises: adjusting the pH of the Trypan Blue solution, adjusting the osmolality of the Trypan Blue solution, or both. In some embodiments, the method further comprises: packaging and/or storing the filtered Trypan Blue solution. In some embodiments, the filtered Trypan Blue solution is stored at a temperature from about 0° C. to about 25° C. In some embodiments, the filtered Trypan Blue solution is free or substantially free of precipitated impurities after storing for at least about 10 minutes at ambient temperature from about 15° C. to about 30° C.

In yet another example, a method comprises: making a Trypan Blue solution according to the present disclosure; combining the Trypan Blue solution with a cell culture medium. In some embodiments, the cell culture medium contains cells to be stained by the Trypan Blue solution. In some embodiments, the method further comprises contacting the combined solution with a sample of cells.

In yet another aspect, the present disclosure provides a kit for performing the methods described herein. In one example, a kit comprises: a Trypan Blue solution; and at least one filtration medium according to the present disclosure. In some embodiments, the kit further comprises a water-soluble polymer stored in a separate container.

In another example, a kit comprises a Trypan Blue solution stored in a first container; a water-soluble polymer stored in a second container.

In some embodiments, the kit described herein further comprises at least one of: an aqueous buffer, an acid, a base, a pH modifier, water, an osmolyte, a cell culture medium, or any combinations thereof, in accordance with the present disclosure.

DETAILED DESCRIPTION

Figure 1:
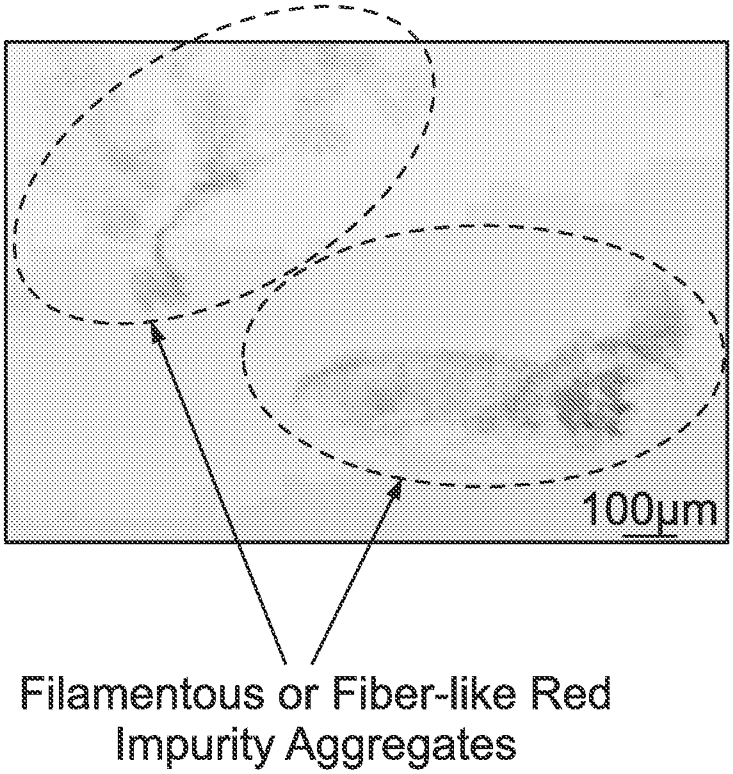
FIG. 1 shows a microscopic image of Trypan Blue solution with presence of a red dye aggregates in the Trypan Blue solution; scale bar is 100 μm.

While the concepts of the present disclosure are illustrated and described in detail in the figures and descriptions herein, results in the figures and their description are to be considered as examples and not restrictive in character; it being understood that only the illustrative embodiments are shown and described and that all changes and modifications that come within the spirit of the disclosure are desired to be protected.

Unless defined otherwise, the scientific and technology nomenclatures have the same meaning as commonly understood by a person in the ordinary skill in the art pertaining to this disclosure.

It will be understood by one of ordinary skill in the relevant arts that other suitable modifications and adaptations to the compositions and methods described herein are readily apparent from the description of the disclosure contained herein in view of information known to the ordinarily skilled artisan, and may be made without departing from the scope of the disclosure or any embodiment thereof. Having now described the present disclosure in detail, the same will be more clearly understood by reference to the following examples, which are included herewith for purposes of illustration only and are not intended to be limiting of the disclosure.

Definition and Interpretation of Selected Terms

As used herein, "weight percent," "wt %," "w/w %," "percent by weight," "% by weight," and variations thereof refer to the concentration of a substance as the weight of that substance divided by the total weight of the composition and multiplied by 100. In some cases, "w/v % refers to the concentration of a substance as the weight of that substance divided by the total volume of the composition and multiplied by 100. It is understood that, for an aqueous composition that has a density (the total weight divided by the total volume) close to 1 g/mL, the concentration of a substance in the composition calculated in either "w/w %" or "w/v %" may have substantially the same value. Accordingly, unless otherwise indicated, "percent," "%," and the like as used herein are intended to be synonymous with "weight percent," "wt %," "w/w %," "w/v %," etc.

As used herein, "g" represents gram; "L" represents liter; "mg" represents "milligram ($10^{-3}$ gram);" "mL" or "cc" represents milliliter ($10^{-3}$ liter). One "μL" equals to one microliter ($10^{-6}$ liter). The units "g/100 g," "g/100 mL," or "g/L" are units of concentration or content of a component in a composition. One "mg/L" equals to one ppm (part per million). "Da" refers to Dalton, which is the unit for molecular weight; One Da equals to one g/mol. The unit of temperature used herein is degree Celsius (° C.).

The term "about" is used in conjunction with numeric values to include normal variations in measurements as expected by persons skilled in the art, and is understood to have the same meaning as "approximately" and to cover a typical margin of error, such as ±15%, ±10%, ±5%, ±1%, ±0.5%, or even ±0.1% of the stated value. The term "about" also encompasses amounts that differ due to different equilibrium conditions for a composition resulting from a particular initial composition. Whether or not modified by the term "about," the claims include equivalents to the quantities.

It should be noted that, as used in this specification and the appended claims, the singular forms "a," "an," and "the" include plural referents unless the content clearly dictates otherwise. Thus, for example, reference to a composition containing "a compound" includes having two or more compounds that are either the same or different from each other. It should also be noted that the term "or" is generally employed in its sense including "and/or" unless the content clearly dictates otherwise. As used herein, "and/or" refers to and encompasses any and all possible combinations of one or more of the associated listed items, as well as the lack of combinations when interpreted in the alternative ("or").

In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

The term "substantially" is utilized herein to represent the inherent degree of uncertainty that can be attributed to any quantitative comparison, value, measurement, or other representation. The term "substantially" is also utilized herein to represent the degree by which a quantitative representation can vary from a stated reference without resulting in a change in the basic function of the subject matter at issue.

The term "substantially free" may refer to any component that the composition of the disclosure lacks or mostly lacks. When referring to "substantially free" it is intended that the component is not intentionally added to compositions of the disclosure. Use of the term "substantially free" of a component allows for trace amounts of that component to be included in compositions of the disclosure because they are present in another component. However, it is recognized that only trace or de minimus amounts of a component will be allowed when the composition is said to be "substantially free" of that component. Moreover, if a composition is said to be "substantially free" of a component, if the component is present in trace or de minimus amounts it is understood that it will not affect the effectiveness of the composition. It is understood that if an ingredient is not expressly included herein or its possible inclusion is not stated herein, the disclosure composition may be substantially free of that ingredient. Likewise, the express inclusion of an ingredient allows for its express exclusion thereby allowing a composition to be substantially free of that expressly stated ingredient.

The term "comprise," "comprises," and "comprising" as used herein, specify the presence of the stated features, integers, steps, operations, elements, and/or components, but do not preclude the presence or addition of one or more other features, integers, steps, operations, elements, components, and/or groups thereof.

As used herein, the transitional phrase "consisting essentially of" means that the scope of a claim is to be interpreted to encompass the specified materials or steps recited in the claim and those that do not materially affect the basic and novel characteristic(s) of the claimed disclosure. Thus, the term "consisting essentially of" when used in a claim of this disclosure is not intended to be interpreted to be equivalent to "comprising."

The term "Trypan Blue" used herein refers to compound CAS #72-57-1 or its conjugate bases. The formula of Trypan Blue is $C_{34}H_{28}N_6O_{14}S_4$, or $C_{34}H_{24}N_6O_{14}S_4Na_4$ in the form of the water-soluble tetrasodium salt, or a mixture thereof. The chemical structure of neutral Trypan Blue is:

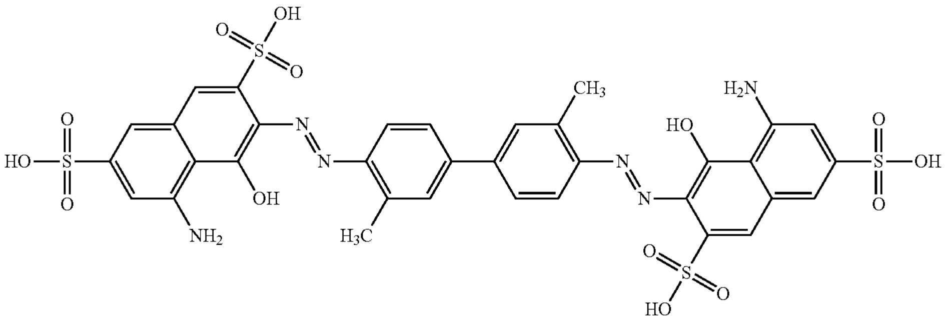 [SMILES: Cc1cc(-c2ccc(/N=N/c3c(S(=O)(=O)O)cc4cc(S(=O)(=O)O)cc(N)c4c3O)c(C)c2)ccc1/N=N/c1c(S(=O)(=O)O)cc2cc(S(=O)(=O)O)cc(N)c2c1O]

Trypan Blue is a water-soluble azo dye that is typically sold as the sodium salt. The structure of the red impurity may be related to Trypan Blue, and likely includes similar functional groups.

The term "polymer" as used herein firstly embraces a collective of macromolecules which are chemically homogeneous but different in relation to degree of polymerization, molar mass and chain length, which has been prepared by a polymerizationreaction (chain growth polymerization, ring-opening polymerization, polyaddition, polycondensation, etc). The term secondly also embraces derivatives of such a collective of macromolecules from polymerization reactions, i.e. compounds which have been obtained by reactions, for example additions or substitutions, of functional groups on given macromolecules, and which may be chemically homogeneous or chemically inhomogeneous. "Polymer" used herein encompass oligomer, homopolymer, copolymer, random copolymer, block copolymer, branched polymer, grafted polymer, dendrimer, or other possible macromolecular architectures.

The term "water-soluble polymer" used herein encompasses polymer substances that dissolve, disperse, or swell in water and, thus, modify the physical properties of aqueous solution. The water-soluble polymer may include a polymer containing an anionic monomeric unit or repeating unit, or a non-ionic monomeric unit or repeating unit, or both an anionic monomeric unit and a non-ionic monomeric unit.

"Anionic polymer" or "polyanionic compound" used herein is a subclass of water-soluble polymer that has at least one anionic functional group covalently linked to the backbone of the polymer. The anionic functional group may be a carboxy group, a sulfo group, a phosphate group, or a salt thereof, or any combinations thereof. Non-limiting examples of the anionic polymer used herein include polymaleic acid, polyacrylic acid, a copolymer of acrylic acid and 2-hydroxy-3-allyioxypropane sulfonic acid, a copolymer of acrylic acid and 2-acrylamide-2-methylpropane suilfonic acid, a copolymer of acrylic acid and isoprene sulfonic acid, a copolymer of acrylic acid and 2-hydroxyethyl methacrylate, a copolymer of acrylic acid, 2-hydroxyethyl methacrylate and isopropylene sulfonic acid, a copolymer of maleic acid and pentene, a copolymer of maleic acid and isobutylene, alkaline metal salts of afore-said anionic polymers and an alkaline earth metal salts of afore-said anionic polymers, poly(vinylphosphoric acid) or salts thereof, poly (vinylsulfonic acid) salts or salts thereof, poly(2-acrylamido-2-methylpropanesulfonate) or salts thereof, poly(4-styrene sulfoinc acid) (PSS), sodium poly(4-styrene sulfonate) (SPS), poly(sodium styrene sulfonate) (PSSS), acrylate/acrylamide copolymers, acrylate homopolymers, acrylate/methacrylate copolymers, methacrylate/acrylamide copolymers, methacrylate/styrene sulfonate copolymers, acrylate/styrene sulfonate copolymers, methacrylate/vinyl sulfonate copolymers and 2-acrylamido-2-methylpropanesulfonic acid sodium salt homopolymer, sulfomethylated polyacrylamide, alginic acid or salts thereof, or any combinations thereof.

"Non-ionic polymer" used herein refers to a subclass of water-soluble polymer that has at least one nonionic functional group covalently linked to the backbone of the polymer. Non-limiting examples of non-ionic polymer include polymer having poly(ethylene glycol), poly(ethylene oxide), poly(vinyl alcohol) and copolymers, poly(N-vinylpyrrolidone) and copolymers, methylcellulose, hydroxyethylcellulose, hydroxypropylcellulose, hydroxypropylmethylcellulose, carboxymethylcellulose, guar gum, hydroxyethylguar, hydroxypropylguar, gelatin, albumin, hydroxypropylmethylguar, carboxymethylguar, carboxymethylchitosan, locust bean gum, carrageenan, xanthan gum, gellan gum, pullulan, alginate, chondroitin sulfate, dextran, dextran sulfate, Aloe vera gel, scleroglucan, schizophyllan, gum arabic, tamarind gum, poly(methyl vinyl ether), ethylene oxide-propylene oxide-ethylene oxide block copolymers, hyaluronan, chondroitin sulfate, keratan sulfate, dermatan sulfate, heparan sulfate, dextran, poly(vinyl methyl ether), polyacrylamide(s), poly(N,N-dimethylacrylamide), poly(N-vinylacetamide), poly(N-vinylformamide), poly(2-hydroxyethyl methacrylate), poly(glyceryl methacrylate), poly(2-ethyl-2-oxazoline), poly(N-isopropylacrylamide) and poly (N-vinylcaprolactam), and the like, and derivatives and combinations thereof. It is noted that the present water-soluble polymer may have both a non-ionic functional group and an ionic function group linked to the backbone of the polymer.

The water-soluble polymer used herein may also include alginic acid or salts of alginic acid. Alginic acid is a linear hetero-polysaccharide comprising units of β-D-mannuronic acid and α-L-guluronic acid. Alginic acid may comprise homopolymeric sequences of mannuronic acid, homopolymeric sequences of guluronic acid, and mixed sequences of mannuronic acid and guluronic acid units. Salts of alginic acid used in the method of the present invention may include alkali metal salts, for example sodium and potassium salts, and ammonium and alkanolamine salts.

"Ambient temperature" as used herein refers to a temperature from about 15 to about 30° C.

For purposes of this disclosure, the chemical elements are identified in accordance with the Periodic Table of the Elements, CAS version, Handbook of Chemistry and Physics, 67th Ed., 1986-87, inside cover.

Overview of Technical Solutions

Figure 2:
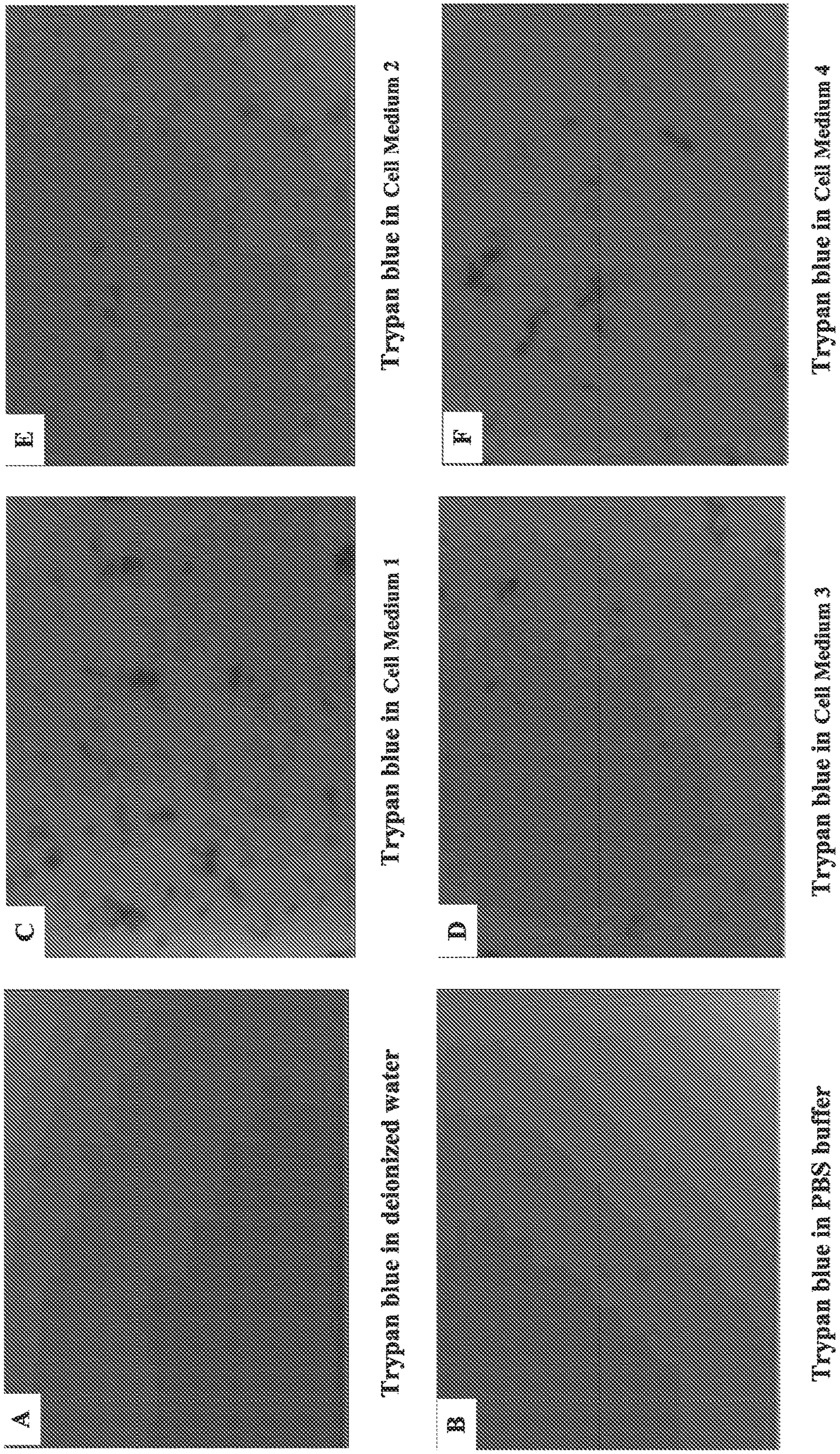
FIG. 2 shows microscopic images of Nominal 0.4% Trypan Blue in NaCl (0.15 mL) (untreated Trypan Blue solution) with various cell culture media or controls (0.20 mL). Images A-F respectively show Trypan Blue in DI water; Trypan Blue in PBS buffer; Trypan Blue in cell medium 1; Trypan Blue in cell medium 3; Trypan Blue in cell medium 2; and Trypan Blue in cell medium 4. DI=deionized water. PBS=isotonic phosphate buffered saline (pH 7.4). Medium 1=Gibco™ CD FortiCHO™ Medium. Medium 2=Gibco™ CD DG44 Medium. Medium 3=Gibco™ LV-MAX™ Production Medium. Medium 4=Gibco™ FreeStyle™ CHO Expression Medium. Images of DI and PBS controls depict the normal degree of precipitate in Nominal 0.4% Trypan Blue in NaCl. Images C, D, E, and F respectively for Medium 1, 2, 3, and 4 depict the formation of precipitate due to exposure to cell culture media.

As discussed above, Trypan Blue solutions may contain unfavorable impurities. Commercial products of Trypan Blue in buffer solutions, for example, commonly contain dye precipitates as received. These aggregates naturally form, propagate, and precipitate from the solution over time when the dye solutions are cooled or stored at a relatively low temperature. Extensive dye precipitation may also be triggered by combination of Trypan Blue solutions and cell culture media, as shown in FIG. 2. Because cells are cultured and handled while suspended in cell culture media, combination of Trypan Blue solutions and cell culture media is a routine and frequently unavoidable step when performing dye exclusion testing.

When dye precipitation is triggered by combination with cell culture media, the appearance of the solution is negatively impacted. The aggregates or precipitates can be confused with biological contamination or debris. Furthermore, the image processing algorithm used by automated cell viability analyzers such as the image processing algorithm used by automated cell viability analyzers may occasionally interpret the precipitate as dead cells, leading to inaccurate results.

The present disclosure provides several approaches to effectively improving the stability of the Trypan Blue solution and/or minimizing the dye precipitation over a long time period. The first approach is generally to formulating or reformulating a Trypan Blue solution that has reduced content of sodium and potassium. It has been identified in the present disclosure that ions such as sodium and potassium cations could contribute to the precipitation of Trypan Blue and formation of large dye aggregates commonly found in solutions of Trypan Blue dye. Replacement of sodium chloride with other types of osmolyte may prevent this common mode of precipitation.

The second approach is generally related to treating or purifying the Trypan Blue solutions by cooling the solutions and subsequently filtering the cooled solutions. It was found that cooling the solution could effectively isolate unwanted impurities that could otherwise initiate and promote dye aggregation. The unwanted impurities could be effectively removed from the Trypan Blue solution by subsequent filtration. The purified Trypan Blue solutions were found to have an improvement on stability and prolonged shelf life with little-to-no precipitation when stored at a wide range of temperature for a long period of time.

The third approach is generally related to compositions and methods for a stable Trypan Blue solution through addition or use of a polymer additive. In particular, it was found that the polymer additive used in the present disclosure could effectively prevent or inhibit precipitation caused by polycationic compounds that may be present in cell culture media. Without wishing to be bound to any particular theory, it is believed that the polymer additive is functioned to (1) capture cationic species in cell culture media and/or (2) capture and stabilize Trypan Blue in the cell culture media. The polymer additive used herein could form a polyelectrolyte complex with positively charged cell culture media constituents. The formation of this polymer complex inhibits or prevents interaction between Trypan Blue and the positively charged cell culture media constituents. As a result, dye precipitation is not observed or occurs more slowly. In addition, the polymer additive used herein binds Trypan Blue through non-ionic, intermolecular interactions to form soluble dye-polymer adducts. The soluble dye-polymer adducts inhibit or prevent interaction of Trypan Blue with the positively charged cell culture media constituents. As a result, dye precipitation is not observed or occurs more slowly.

It is noted that the above three general approaches are compatible to each other and may be combined, in any manner, to synergistically improve the stability of the Trypan Blue solutions.

Compositions

In one aspect, the present disclosure relates to a composition. In some examples, the composition is an aqueous solution of Trypan Blue. The composition may further include one or more ingredients, including but not limited to an osmolyte, an aqueous buffer, an acid, a base, a pH modifier, a polymer additive, a cell culture medium, a preservative, water, or any combinations thereof.

In some embodiments, the Trypan Blue solution according to the present disclosure has a weight content or concentration of Trypan Blue from about 0.01% to about 2%, or from about 0.05% to about 1%, or from about 0.1% to about 0.5%, or from about 0.2% to about 0.5%, based on the total weight (in the unit of w/w %) or total volume (in the unit w/v %) of the Trypan Blue solution. In some embodiments, the concentration of Trypan Blue is at least about 0.05%, at least about 0.1%, at least about 0.15%, at least about 0.2%, at least about 0.25%, at least about 0.3%, at least about 0.35%, at least about 0.4%, at least about 0.45%, or at least about 0.5%, based on the total weight (in the unit of w/w %) or total volume (in the unit w/v %) of the Trypan Blue solution.

In some embodiments, the Trypan Blue solution includes an osmolyte. The amount of osmolyte and/or the ratio of the osmolyte to the Trypan Blue may be balanced to produce a physiologically isotonic solution containing approximately 300 mOsm/L dissolved solids.

In some embodiments, the osmolyte of the Trypan Blue solution is non-toxic to cells over the duration of the dye staining period. The osmolyte can be of sufficiently low molecular weight such that an osmolality of about 300 mOsm/L for the Trypan Blue solution can be obtained without addition of excessive solid. In some embodiments, the osmolyte has a molecular weight of less than about 1,000 g/mol, or less than about 500 g/mol, or less than about 250 g/mol.

In some embodiments, the osmolyte comprises at least one of: an amino acid or derivatives thereof such as stereoisomers, a di-, tri-, and polypeptide derived from amino acids and their stereoisomers, natural and synthetic monosaccharides such as aldo- and ketohexoses and pentoses, diols, polyols such as sugar alcohols, lithium salts, low molecular weight polymers such as polyethylene glycols, Good's buffers, a low molecular weight physiological osmolyte such as taurine, sarcosine, betaine, urea, or trimethylamine N-oxide (TMAO), or any combinations thereof. In some embodiments, the osmolyte of the Trypan Blue solution comprises lithium chloride, D-glucose, or L-glycine, or any combination thereof.

In some embodiments, the Trypan Blue solution includes an acid or a base. The acid or base can be used to adjust pH and buffer of the solution. The acid or base can be organic or inorganic. The acid can be, for example, carboxylic acids such as acetic acid or lactic acid, hydrochloric acid, phosphoric acid and the like. The base can be, for example, lithium or potassium hydroxide, sodium or potassium bicarbonate, sodium or potassium carbonate, amine bases, ammonia, and the like.

In some embodiments, the Trypan Blue solution includes a pH modifier such as a buffer. One example of the buffer is a sodium azide preserved phosphate buffered saline (PBS) buffer.

In some embodiments, the Trypan Blue solution has a pH from about 6.0 to about 9.0, or from about 6.5 to about 8.0, or from about 7.0 to about 7.5. In some embodiments, the pH of the Trypan Blue solution is at least about 6.5, at least about 6.6, at least about 6.7, at least about 6.8, at least about 6.8, at least about 6.9, at least about 7.0, at least about 7.1, at least about 7.2, at least about 7.3, at least about 7.4, at least about 7.5, at least about 7.6, at least about 7.7, at least about 7.8, at least about 7.9, at least about 8.0.

In some embodiments, the Trypan Blue solution further comprises one or more preservatives. Non-limiting examples of the preservative include: sodium azide, 2-phenoxyethanol, formaldehyde, formaldehyde-formers such as DMDM hydantoin, imidazolidinyl urea, diazolidinyl urea, sodium hydroxymethylglycinate, 2-bromo-2-nitropropane-1,3-diol, or 5-bromo-5-nitro-1,3-dioxane, isothiazolinones such as methylisothiazolinone, chloromethylisothiazolinone, benzisothiazolinone, benzoic acid and its alkali metal salts, sorbic acid and its alkali metal salts, parabens, or a combination thereof.

In some embodiments, the osmolyte of the present Trypan Blue solution does not include sodium chloride. In certain embodiments, the present disclosure is free or substantially free from sodium chloride. Alternatively, no sodium chloride is used as a starting material in the process of preparing and/or reformulating and/or treating the present Trypan Blue solution.

In some embodiments, the present Trypan Blue solution has a concentration of sodium of about 20 mmol/L or less, or about 16 mmol/L or less, or about 12 mmol/L or less, or about 8 mmol/L or less, or about 5 mmol/L, or about 2 mmol/L or less, or about 1.5 mmol/L or less, or about 1 mmol/L or less, or about 0.5 mmol/L or less, or about 0.1 mmol/L less, or about 0.01 mmol/L or less, or about 0.001 mmol/L or less, or about 0.0001 mmol/L or less. In some embodiments, the present Trypan Blue solution is free or substantially free from sodium and its ionic form.

In some embodiments, the present Trypan Blue solution has a concentration of potassium of about 20 mmol/L or less, or about 10 mmol/L or less, or about 5 mmol/L or less, or about 2 mmol/L or less, or about 1 mmol/L, or about 0.5 mmol/L or less, or about 0.1 mmol/L less, or about 0.01 mmol/L or less, or about 0.001 mmol/L or less, or about 0.0001 mmol/L or less. In some embodiments, the present Trypan Blue solution is free or substantially free from potassium and its ionic form.

In some embodiments, the present Trypan Blue solution has a concentration of lithium of at least about 0.5 mmol/L, or at least about 1 mmol/L, or at least about 1.5 mmol/L, or at least about 2 mmol/L, or at least about 5 mmol/L, or at least about 10 mmol/L, or at least about 14 mmol/L.

In some embodiments, the present trypan solution has an osmolality of about 250 to about 350 mOsm $kg^{-1}$, or about 270 to about 330 mOsm $kg^{-1}$, or about 280 to about 320 mOsm $kg^{-1}$, or about 290 to about 310 mOsm $kg^{-1}$.

In some embodiments, the present Trypan Blue solution further includes a polymer. The polymer is preferably a water soluble polymer such as an anionic polymer, a nonionic polymer, or any combinations thereof.

In some embodiments, the Trypan Blue solution includes an anionic polymer selected from: poly(acrylic acid) or a salt thereof, poly(4-styrene sulfonate) or a salt thereof, poly (vinyl pyrrolidone), or any combinations thereof.

In some embodiments, the water-soluble polymer has an average molecular weight from about 500 g/mol to about 200,000 g/mol, or from about 1,000 g/mol to about 150,000 g/mol, or from about 2,000 g/mol to about 100,000 g/mol, or from about 3,000 g/mol to about 70,000 g/mol, or from about 4,000 g/mol to about 40,000 g/mol, or from about 5,000 g/mol to about 20,000 g/mol, or from about 7,000 g/mol to about 15,000 g/mol, or from about 7,000 g/mol to about 10,000 g/mol.

In some embodiments, the present Trypan Blue solution has a concentration of the water-soluble polymer from about 0.01% to about 10%, or from about 0.02% to about 8%, or from about 0.03% to about 6%, or from about 0.05% to about 4%, or from about 0.1% to about 3%, or from about 0.2% to about 2%, or from about 0.5% to about 1%, based on the total weight (w/w %) or total volume (w/v %) of the Trypan Blue solution.

In some embodiments, the present Trypan Blue solution has a repeating unit concentration of the water-soluble polymer, calculated based on the ratio of the total mols of the repeating unit of the water-soluble polymer to the total weight (w) or the total volume (v) of the Trypan Blue solution, from about 1 mmol/L to about 1,000 mol/L, or from about 5 mmol/L to about 500 mmol/L, or from about 10 mmol/L to about 100 mmol/L.

In some embodiments, the present trypan solution may have a molar ratio of repeating unit of the water-soluble polymer to Trypan Blue of at least about 1, or at least about 2, or at least about 3, or at least about 5, or at least about 10, or at least about 20, or at least about 30, or at least about 50, or at least about 100, or at least about 200. In some embodiments, the molar ratio of repeating unit of the water-soluble polymer to Trypan Blue is from about 1 to about 100, or from about 2 to about 75, or from about 3 to about 55, or from about 5 to about 26.

In certain embodiments, the present trypan solution includes a poly(acrylic acid)alkali salt. The poly(acrylic acid) alkali salt may have a molar percentage of alkali salt from about 0 to about 100%, or from about 10% to about 90%, or from about 20% to about 80%, or from about 30% to about 70%, or from about 40% to about 60%. The poly(acrylic acid) alkali salt may have a molecular weight from about 500 g/mol to about 20,000 g/mol, or from about 2,000 g/mol to about 10,000 g/mol, or from about 4,000 to about 6,000 g/mol. In some embodiments, the alkali metal of the poly(acrylic acid) alkali salt comprises sodium, potassium, or lithium, or any combinations thereof. In some embodiments, the alkali metal comprises lithium and is free or substantially free from both sodium and potassium. The poly(acrylic acid) alkali salt may have a concentration from about 0.01 w/v % to about 5 w/v %, or from about 0.05 w/v % to about 2 w/v %, or from about 0.1 w/v % to about 1 w/v %. The poly(acrylic acid) alkali salt may have a repeating unit concentration from about 1 mmol/L to about 500 mmol/L, or from about 5 mmol/L to about 200 mmol/L, or from about 10 mmol/L to about 120 mmol/L. In some embodiments, the molar ratio of repeating unit of the poly (acrylic acid) alkali salt to Trypan Blue is from about 1 to about 100, or from about 5 to about 75, or from about 25 to about 55.

In certain embodiments, the present trypan solution includes a poly(4-styrene sulfonate) alkali salt. Similar to the poly(acrylic acid) alkali salt, the poly(4-styrene sulfonate) alkali salt may have a molar percentage of alkali salt from about 0 to about 100%, or from about 10% to about 90%, or from about 20% to about 80%, or from about 30% to about 70%, or from about 40% to about 60%. The poly(4-styrene sulfonate) alkali salt may have a molecular weight from about 1,000 g/mol to about 200,000 g/mol, or from about 10,000 g/mol to about 100,000 g/mol, or from about 50,000 to about 80,000 g/mol. In some embodiments, the alkali metal of the poly(4-styrene sulfonate) alkali salt comprises sodium, potassium, or lithium, or any combinations thereof. In some embodiments, the alkali metal comprises lithium and is free or substantially free from both sodium and potassium. The poly(4-styrene sulfonate) alkali salt may have a concentration from about 0.02 w/v % to about 10 w/v %, or from about 0.1 w/v % to about 5 w/v %, or from about 0.5 w/v % to about 2.5 w/v %. The poly(4-styrene sulfonate) alkali salt may have a repeating unit concentration from about 1 mmol/L to about 500 mmol/L, or from about 5 mmol/L to about 200 mmol/L, or from about 10 mmol/L to about 120 mmol/L. In some embodiments, the molar ratio of repeating unit of the poly(4-styrene sulfonate) alkali salt to Trypan Blue is from about 1 to about 100, or from about 5 to about 75, or from about 25 to about 55.

In certain embodiments, the present trypan solution includes a poly(vinyl pyrrolidone). The poly(vinyl pyrrolidone) may have a molecular weight from about 1,000 g/mol to about 200,000 g/mol, or from about 10,000 g/mol to about 100,000 g/mol, or from about 30,000 to about 50,000 g/mol. The poly(vinyl pyrrolidone) may have a concentration from about 0.01 w/v % to about 10 w/v %, or from about 0.05 w/v % to about 5 w/v %, or from about 0.2 w/v % to about 2 w/v %. The poly(vinyl pyrrolidone) may have a repeating unit concentration from about 1 mmol/L to about 500 mmol/L, or from about 5 mmol/L to about 200 mmol/L, or from about 10 mmol/L to about 120 mmol/L. In some embodiments, the molar ratio of repeating unit of the poly(vinyl pyrrolidone) to Trypan Blue is from about 1 to about 100, or from about 5 to about 75, or from about 25 to about 55.

In some embodiments, the present Trypan Blue solution further includes a cell culture medium. The cell culture medium may be from a commercial product, such as Gibco™ CD FortiCHO™ Medium. Gibco™ CD DG44 Medium, Gibco™ LV-MAX™ Production Medium, Gibco™ FreeStyle™ CHO Expression Medium.

In one particular example, the present Trypan Blue solution comprises Trypan Blue, a buffer, an osmolyte, and a water-soluble polymer. In some embodiments, the osmolyte is a sodium chloride. In other embodiments, the Trypan Blue solution is free or substantially free from sodium salt as an ingredient introduced to the Trypan Blue solution. In some embodiments, the osmolyte is selected from the group consisting of lithium chloride, D-glucose, or L-glycine, or any combinations thereof. In some embodiments, the water-soluble polymer is selected from poly(acrylic acid) or a salt thereof, poly(4-styrene sulfonate) or a salt thereof, poly (vinyl pyrrolidone), or any combinations thereof.

In some embodiments, the present Trypan Blue solution as prepared is stable and free or substantially free of precipitated impurities after storing at a temperature for a period of time. The temperature may be in a range from about 4° C. to about 50° C., or from about 8° C. to about 43° C., or from about 12° C. to about 37° C., or from about 16° C. to about 30° C., or from about 20° C. to about 23° C. The period of time may be at least about 5 mins, at least about 10 mins, at least about 30 mins, at least about 1 hour, at least about 2 hours, at least about 3 hours, at least about 6 hours, at least about 12 hours, at least about 1 day, or at least about 2 days, or at least about 3 days, or at least about 4 days, or at least about 5 days, or at least about 6 days, or at least about 7 days, or at least about 2 weeks, or at least about 3 weeks, or at least about 4 weeks, or at least about one month, or at least about two months, or at least about 3 months or the like.

Methods and Kits

In some aspects, the present disclosure relates to a method. The method may be used for at least one of: preparing a stable Trypan Blue solution, treating a Trypan Blue solution, stabilizing a Trypan Blue solution, purifying a Trypan Blue solution, improving stability of a Trypan Blue solution, and cell staining with a Trypan Blue solution.

In some embodiments, a method for making a Trypan Blue solution comprises: mixing Trypan Blue with at least one ingredient selected from: an osmolyte, a buffer solution, an acid, a base, a pH modifier, a preservative, a water soluble polymer, a cell culture medium, water, or any combinations thereof. The ingredients and various aspects of the Trypan Blue solution are described supra and will not be repeated. The ingredients can be added in any order. The mixing can be stirring, shaking, or mixing with continuous flow or turbulent flow. In some embodiments, the ingredient may be in any physical form such as solid, powder, concentrate, or stock solution. A skilled artisan will calculate the required amount of each ingredient to arrive at the Trypan Blue solution with desired concentration and composition.

In general, a method for making or treating or stabilizing or purifying a Trypan Blue solution includes at least one of the following treatment operations (or steps): preparing or providing a Trypan Blue solution; mixing the Trypan Blue solution with a water-soluble polymer; mixing the Trypan Blue solution with one or more ingredients; cooling the Trypan Blue solution; filtering the cooled solution; adjusting pH of the Trypan Blue solution; adjusting osmolality of the Trypan Blue solution; adjusting a molar ratio of the water-soluble polymer to Trypan Blue; repeating at least one the above-mentioned operation. The operations may be performed in any manner of combination or in any order. The operations may be performed simultaneously, sequentially, or in an otherwise coordinated fashion.

The Trypan Blue solution prior to treatment/stabilization/purification may be made or provided prior to cooling. The Trypan Blue solution prior to treatment may be any Trypan Blue solution described supra. The Trypan Blue solution prior to treatment may be as received from a commercial source, or as freshly prepared, or aged/stored for a period of time. The Trypan Blue solution prior to treatment may be unstable or include visible impurity, or aggregates, or precipitates.

The Trypan Blue solution prior to treatment/stabilization/purification may be a buffer solution of Trypan Blue, with a content or concentration of Trypan Blue from about 0.01% to about 2%, or from about 0.05% to about 1%, or from about 0.1% to about 0.5%, or from about 0.2% to about 0.5%, based on the total weight (in the unit of w/w %) or total volume (in the unit w/v %) of the Trypan Blue solution. In some embodiments, the Trypan Blue may be mixed with an aqueous buffer at ambient or near-ambient temperature and pressure before treatment. The Trypan Blue may also be mixed with the aqueous buffer at temperature higher than ambient temperature.

In some embodiments, the Trypan Blue solution prior to any treatment step further comprises at least one of: an osmolyte, an acid or base, a water-soluble polymer, a cell culture medium or any combinations thereof.

In one example, a method for making or treating or stabilizing or purification of a Trypan Blue solution comprises: mixing a Trypan Blue solution with a water-soluble polymer according to the present disclosure. In some embodiments, the method further comprises adjusting a molar ratio of repeating unit of the water-soluble polymer to Trypan Blue to at least about 1, or at least about 2, or at least about 3, or at least about 5, or at least about 10, or at least about 20, or at least about 30, or at least about 50, or at least about 100, or at least about 200. In some embodiments, the molar ratio of repeating unit of the water-soluble polymer to Trypan Blue is from about 1 to about 100, or from about 2 to about 75, or from about 3 to about 55, or from about 5 to about 26. The water-soluble polymer may be from a source of a stock solution as described supra.

In some embodiments, the method further comprises: filtering the Trypan Blue solution before, or after adding the water-soluble polymer. The filtration step may be performed through use of a filtration medium such as a syringe filter or a canister filter common in the art. The filtration medium may have an average pore size from about 0.05 μm to about 1 μm, or from about 0.1 μm to about 0.5 μm. Common filters, such as Pall Acrodisc 0.2 μm or 0.45 μm Nylon syringe filters may be used in the filtration step. In some embodiments, multiple rounds of filtration may be performed.

In some embodiments, the method further comprises: cooling the Trypan Blue solution before the filtration step. The cooling step may be performed before, after, or before and after adding the water-soluble polymer. In some embodiments, the Trypan Blue solution is cooled to a temperature for a period of time. The temperature is about 14° C. or less, about 13° C. or less, about 12° C. or less, about 11° C. or less, about 10° C. or less, about 9° C. or less, about 8° C. or less, about 7° C. or less, about 6° C. or less, about 5° C. or less, about 4° C. or less, about 3° C. or less, about 2° C. or less, about 1° C. or less, or about 0° C. In some embodiments, the temperature is in a range from about 0° C. to about 14° C., or from about 3° C. to about 10° C., or from about 4° C. to about 6° C. The period of time for cooling the Trypan Blue solution may be at least about 1 hour, at least about 2 hours, at least about 3 hours, at least about 6 hours, at least about 12 hours, at least about 1 day, at least about 2 days, at least about 3 days, at least about 7 days.

In some embodiments, the method further comprises: mixing Trypan Blue with at least one ingredient selected from: an osmolyte, an acid, a base, a pH modifier, a buffer solution, a cell culture medium, water, or any combinations thereof, in accordance with the present disclosure.

In some embodiments, the method further comprises adjusting the pH of the Trypan Blue solution. Adjustment of pH may be performed by adding a pH modifier, buffer, an acid or a base to the Trypan Blue solution before, during, or after the filtration step. In some embodiments, the pH of the Trypan Blue solution is first adjusted to a first pH to promote precipitation of impurities. The first pH may be relatively acidic, e.g., from about 6 to about 7. After filtration, the pH of the filtered (or residual) Trypan Blue solution is adjusted to relatively basic, e.g. from about 7 to about 8, under which Trypan Blue is more stable in the solution.

In some embodiments, the method further comprises adjusting the osmolality of the Trypan Blue solution. Adjustment of osmolality may be performed by adding an osmolyte to the Trypan Blue solution before, during, or after the filtration step.

In some embodiments, the method further comprises packaging the Trypan Blue solution in a package after filtration. The packaging may be done at ambient temperature. The package may be a bottle, a rigid or flexible plastic container, a glass container, a metal container, or a metal drum. The Trypan Blue solution can be stored at a temperature from about 0° C. to about 50° C., or from about 10° C. to about 45° C., or from about 20° C. to about 40° C., or from about 23° C. to about 37° C., after packaging.

The following embodiments further described the example method. In one particular embodiment, a method comprises mixing a water-soluble polymer with a Trypan Blue solution without a cooling or filtration step. In another particular embodiment, a method comprises: mixing a water-soluble polymer with a Trypan Blue solution; and filtering the Trypan Blue solution. In yet another embodiment, a method comprises: mixing a water-soluble polymer with a Trypan Blue solution; cooling the Trypan Blue solution; and filtering the Trypan Blue solution. In a further embodiment, a method comprises: providing or preparing a Trypan Blue solution; cooling the Trypan Blue solution; filtering the Trypan Blue solution; and adding a water-soluble polymer to the cooled solution.

In another example, a method for making or treating or stabilizing or purifying a Trypan Blue solution comprises: cooling a Trypan Blue solution; and filtering the cooled solution.

In some embodiments, the method further comprises: providing or preparing a Trypan Blue solution prior to cooling. In some embodiments, providing a Trypan Blue solution comprises making a Trypan Blue solution by mixing Trypan Blue with at least one ingredient selected from: an osmolyte, an acid, a base, a buffer solution, a pH modifier, a water-soluble polymer, a cell culture medium, water, or any combinations thereof, in accordance with the present disclosure. In some embodiments, the method further comprises adding an ingredient to the trypan solution before, during, or after the cooling step. In some embodiments, the method further comprises adding an ingredient to the trypan solution before, or after the filtration step.

In some embodiments, the method further comprises: repeating the cooling and/or the filtration step. For example, another filtration step may be performed before cooling the Trypan Blue solution.

In some embodiments, the Trypan Blue solution prior to cooling is a buffer solution of Trypan Blue, with a content or concentration of Trypan Blue from about 0.01% to about 2%, or from about 0.05% to about 1%, or from about 0.1% to about 0.5%, or from about 0.2% to about 0.5%, based on the total weight (in the unit of w/w %) or total volume (in the unit w/v %) of the Trypan Blue solution. In some embodiments, the Trypan Blue may be mixed with an aqueous buffer at ambient or near-ambient temperature and pressure before cooling. The Trypan Blue may also be mixed with the aqueous buffer at temperature higher than ambient temperature.

In some embodiments, the Trypan Blue solution prior to cooling further comprises at least one of: an osmolyte, an acid or base, a water-soluble polymer, a cell culture medium or any combinations thereof.

In some embodiments, the Trypan Blue solution is cooled to a temperature for a period of time. The temperature is about 14° C. or less, about 13° C. or less, about 12° C. or less, about 11° C. or less, about 10° C. or less, about 9° C. or less, about 8° C. or less, about 7° C. or less, about 6° C. or less, about 5° C. or less, about 4° C. or less, about 3° C. or less, about 2° C. or less, about 1° C. or less, or about 0° C. In some embodiments, the temperature is in a range from about 0° C. to about 14° C., or from about 3° C. to about 10° C., or from about 4° C. to about 6° C.

In some embodiments, the method further comprises adjusting the pH of the Trypan Blue solution. Adjustment of pH may be performed by adding a pH modifier, buffer, an acid or a base to the Trypan Blue solution before, during, or after the filtration step. In some embodiments, the pH of the Trypan Blue solution is first adjusted to a first pH value to promote precipitation of impurities. The first pH may be relatively acidic, e.g., from about 6 to about 7. After filtration, the pH of the filtered (or residual) Trypan Blue solution is adjusted to a second pH value. The second pH value may be relatively basic, e.g. from about 7 to about 8, under which Trypan Blue is more stable in the solution.

In some embodiments, the method further comprises adjusting the osmolality of the Trypan Blue solution. Adjustment of osmolality may be performed by adding an osmolyte to the Trypan Blue solution before, during, or after the filtration step.

In some embodiments, the method further comprises adding a water-soluble polymer to the Trypan Blue solution, as described supra. In other embodiments, no water-soluble polymer is used in the present method.

The methods described herein can reduce solid impurities from the treated/stabilized Trypan Blue solution. The solid impurities could be reduced by at least about 50%, at least about 55%, at least about 60%, at least about 65%, at least about 70%, at least about 75%, at least about 80%, at least about 85%, at least about 90%, at least about 95%, at least about 99%, or about 100%.

The present methods may enable the treated Trypan Blue solution to remain stable and free or substantially free from aggregates and precipitates at a temperature for a period of time sufficient for cell staining test. In some embodiments, the Trypan Blue solution treated by the present methods are stable for at least about 5 mins, at least about 10 mins, at least about 30 mins, at least about 1 hour, at least about 2 hours, at least about 3 hours, at least about 6 hours, at least about 12 hours, at least about 1 day, or at least about 2 days, or at least about 3 days, or at least about 4 days, or at least about 5 days, or at least about 6 days, or at least about 7 days, or at least about 2 weeks, or at least about 3 weeks, or at least about 4 weeks, or at least about one month, or at least about two months, or at least about 3 months or the like. The temperature at which the treated Trypan Blue solution could remain stable ranges from about 0 to about 50° C., or from about 10° C. to about 45° C., or from about 20° C. to about 40° C., or from about 23° C. to about 37° C.

In some aspects, the present disclosure relates to a method for cell staining. In one example, the method comprises: providing a Trypan Blue solution described herein; combining the Trypan Blue solution with a cell culture medium; and contacting the combined solution with a sample of cells to be stained. The cell culture medium may contain cells to be stained by the Trypan Blue solution. In some embodiments, the present disclosure relates to providing a Trypan Blue solution comprising treating or stabilizing or purifying a Trypan Blue solution through use of the methods or any operations thereof described herein.

In some aspects, the present disclosure relates to a kits comprising components useful in performing any of the methods disclosed herein, e.g., for making or treating or stabilizing or purifying a Trypan Blue solution. The kit may include various ingredients disclosed herein, a prepared Trypan Blue solution, a filtration medium disclosed herein, an instruction, or combinations thereof. The various ingredients may be stored in separate containers.

Instructions as disclosed herein may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, etc. Yet another means would be a computer readable medium, e.g., electronic memory, proximity integrated circuit card (PICC), diskette, tape, or CD, etc., on which the information has been recorded. Another means that may be present is a website address which may be used via the Internet to access the information at a removed site. Any convenient means may be present in the kits.

In one example, a kit comprises a Trypan Blue buffer solution stored in a container; and a filter medium, in accordance with the description supra. In another example, a kit comprises a Trypan Blue buffer solution stored in a container; and a water-soluble polymer stored in a separate container, in accordance with the description supra. The water-soluble polymer may be in a form of solid or power, or a stock solution with ascertained concentration.

In some embodiments, the kit comprises a Trypan Blue solution stored in a container; a water-soluble polymer stored in a separate container; and a filtration medium. In some embodiments, the kit may further comprise one or more ingredients selected from: an osmolyte, an acid, a base, a buffer, a pH modifier, a cell culture medium, or any combinations thereof, in accordance with the description supra. The ingredients are stored in separate containers.

In some embodiments, the kit further comprises an instruction that provides users with a guidance to perform the methods according to the present disclosure.

All publications, patents and patent applications mentioned in the specification are indicative of the level of those skilled in the art to which this disclosure pertains.

EXAMPLES

The following non-limiting examples are provided for illustrative purposes only in order to facilitate a more complete understanding of representative embodiments now contemplated. These examples should not be construed to limit any of the embodiments described in the present specification, including those pertaining to the methods of making, or treating, or stabilizing, or purifying a Trypan Blue solution, or methods for cell staining.

Example 1—Treatment of Trypan Blue Solutions

Figure 3:
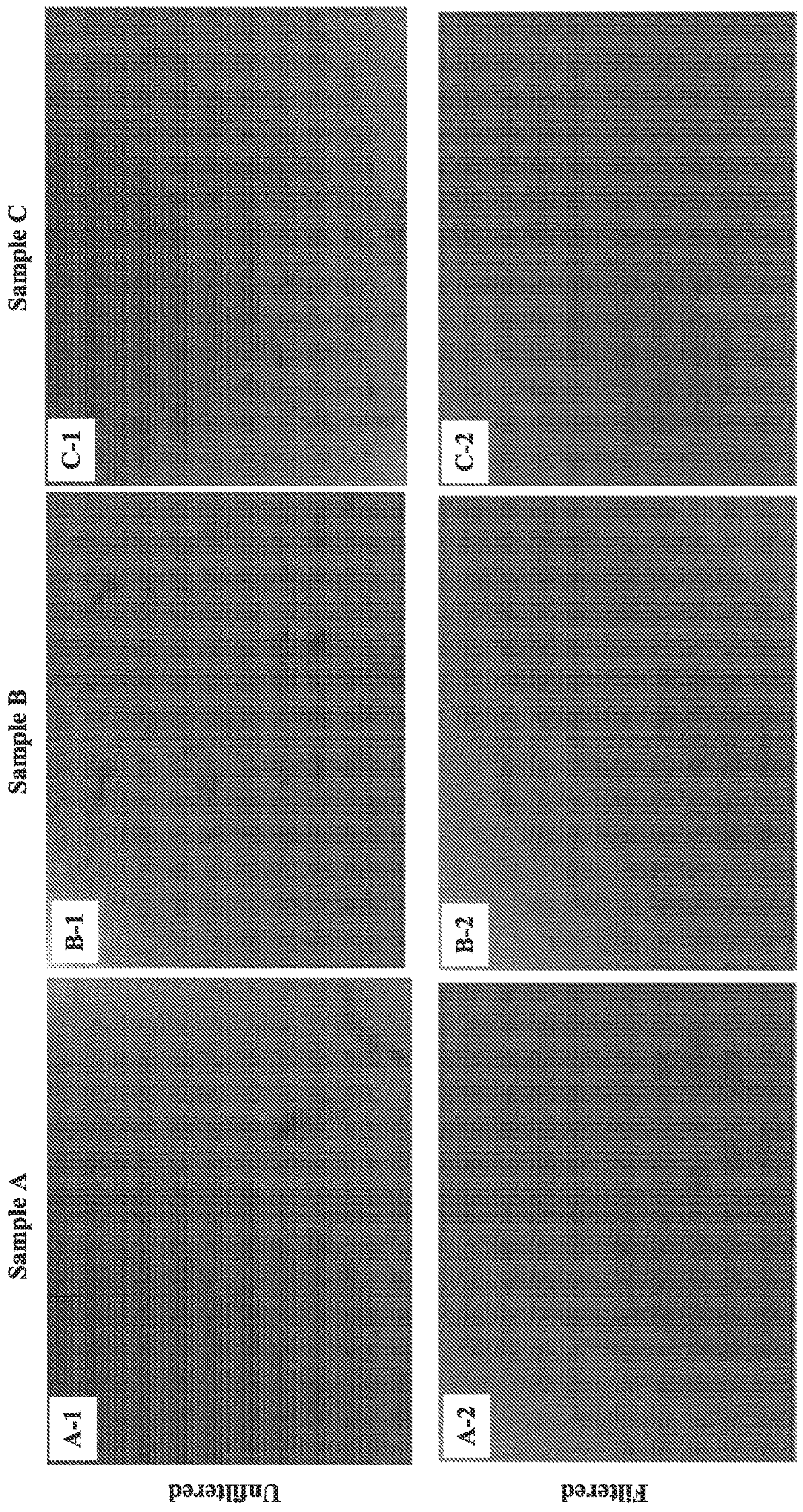
FIG. 3 shows microscopic images of three samples of Trypan Blue in PBS stored at 4° C. for 14 h before and after 0.2 m filtration. Image A-1 is a microscopic image of Sample A before filtration; Images A-1 and A-2 respectively show Sample A before and after filtration; Images B-1 and B-2 respectively show Sample B before and after filtration; Images C-1 and C-2 respectively show Sample C before and after filtration. Debris consists of red dye aggregates and appears blue due to lighting conditions. The three samples of the Trypan Blue in PBS are all received from commercial sources without further treatment. Sample A has an expiration date of 10-23-2020; Sample B has an expiration date of Oct. 10, 2021; Sample C has an expiration date of Oct. 3, 2021.

A study was performed to determine the effect of cold filtration on Trypan Blue in PBS. Three different commercial samples of Trypan Blue solution (Sample A, Sample B, Sample C) were studied. The samples all contain about 0.2% w/v Trypan Blue. The samples as received were inspected by microscope without further treatment and found to contain red impurity aggregates. Sample solutions were then stored at 4° C. for 14 h to promote additional red dye aggregation. A portion of each cold sample solution was filtered through Pall Acrodisc 0.2 m Nylon syringe filters and imaged by microscope, as a comparison, a portion of each cold sample solution was unfiltered and imaged by microscope under the same condition. The microscopic images were summarized in FIG. 3. As can be seen, little-to-no dye aggregates were observed for all of the filtered Trypan Blue solutions (from Sample A, B, and C). In contrast, significant dye aggregates were found in all Trypan Blue solutions that were not filtered.

Figure 4:
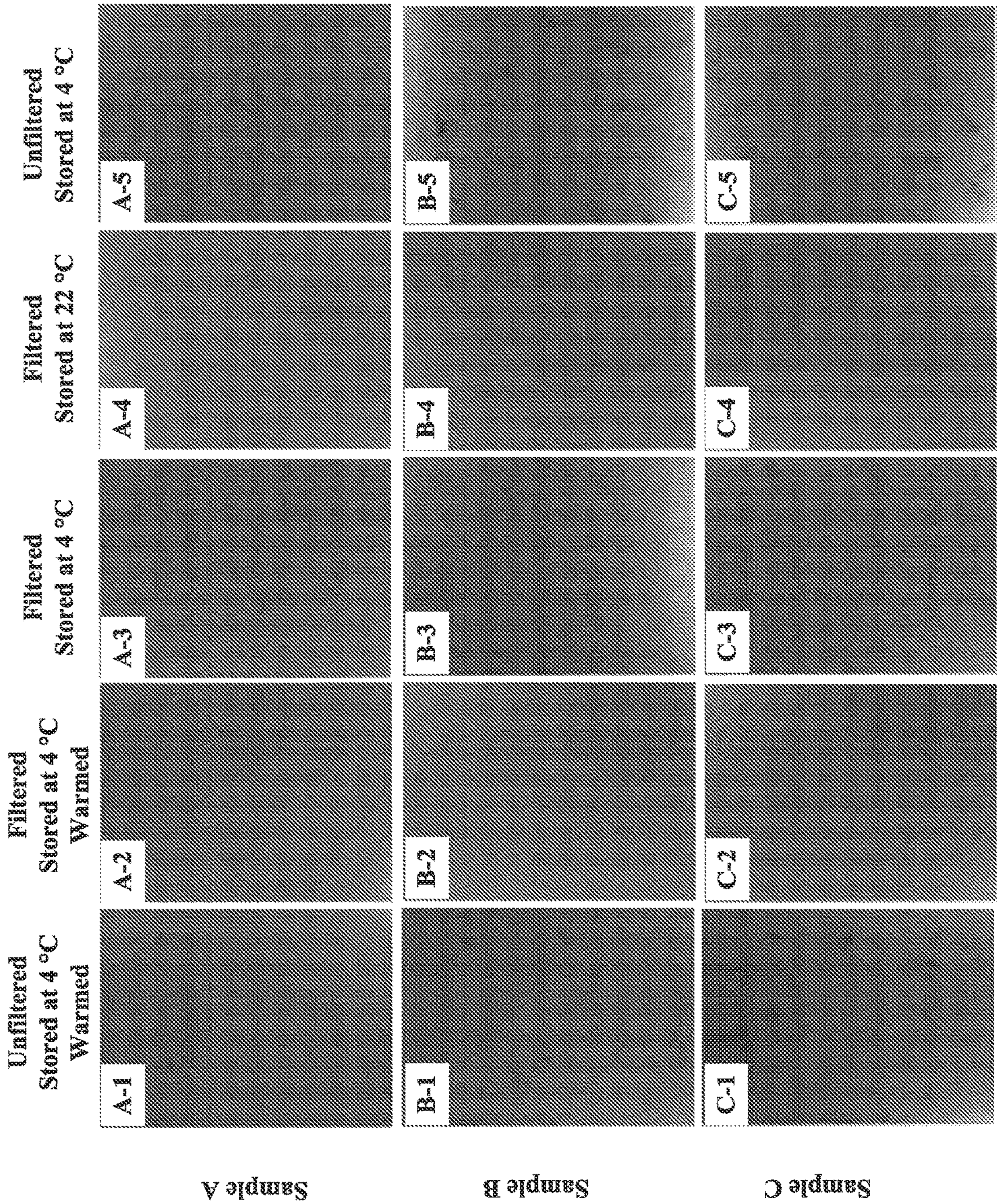
FIG. 4 shows microscopic images of three samples (Sample A, B and C) of Trypan Blue in PBS stored under various conditions: (1) unfiltered dye solution stored at 4° C., (2) filtered dye solution stored at 22° C. for five days; (3) filtered dye solution stored at 4° C. for five days; (4) filtered dye solution stored at 4° C. for five days followed by 22° C. for 3 h; (5) unfiltered dye solution stored at 4° C. for five days followed by 22° C. for 3 h.

The above sample solutions were each split into two portions, which were stored respective at 4° C. or 22° C. for five days. After storage, the sample solutions were imaged by microscope, and the results were summarized in FIG. 4. As can be seen, dye aggregates did not reappear in all three Trypan Blue solutions (from Sample A, B and C) that were filtered and stored at 22° C. for five days. In contrast, a significant amount of dye aggregates were found in the filtered solution that were stored at 4° C. However, it was found that warming the cold filtrate to ambient temperature at 22° C. for 3 h could result in dissolution of most dye aggregates. In comparison, warming unfiltered Trypan Blue solution under identical conditions did not lead to substantial dissolution of the dye aggregates.

The filtered and unfiltered solutions were stored for an additional two days at ambient temperature (22° C.). After this storage period, inspection by microscope revealed that the filtered solution was largely free of dye aggregates. The unfiltered solution exhibited dye aggregation typical of Trypan Blue in PBS.

Without cooling and filtering the Trypan Blue solutions, dye aggregates readily formed and persisted at 4° C. or 22° C., which reflects the normal behavior of untreated Trypan Blue solutions. After cooling and subsequently filtering the Trypan Blue solutions, aggregates reappeared after storage at the 4° C. filtration temperature, but did not persist at 22° C.

These above surprising results support that treatment the Trypan Blue solution by cooling and filtration effectively removes most of the insoluble dye aggregates from the Trypan Blue solution, and promotes the stability of the Trypan Blue solution.

Example 2—Reformulation of Trypan Blue Solutions

In preliminary experiments it was found that addition of 250 mM sodium chloride to a 0.2% w/v aqueous solution of Trypan Blue resulted in rapid precipitation of the dye. In the presence of 150 mM sodium chloride, 0.2% w/v Trypan Blue exhibited precipitation after storage for 16 hours at 4° C. Red colored aggregates of the Trypan Blue impurity were the primary form of precipitate. In contrast, Trypan Blue dissolved in deionized water at 0.2% w/v did not form red colored dye aggregates after two weeks at 4° C.

At 150 mM concentrations, the alkali metal salts potassium chloride (KCl) and cesium chloride (CsCl) produced dye aggregation. Sodium azide ($NaN_3$), monosodium phosphate ($NaH_2PO_4$), and sodium sulfite ($Na_2SO_3$) also promoted dye aggregation at 150 mM sodium concentrations, suggesting that this effect is largely dependent on the cation. In comparison, lithium chloride did not promote dye aggregation at concentrations as high as 600 mM.

Example reformulations were made based on lithium chloride, D-glucose, and L-glycine (Table 1). Each Example reformulation consisted of 0.2% w/v Trypan Blue dissolved in sodium phosphate buffer preserved with sodium azide. Lithium chloride, D-glucose, or L-glycine were added in a quantity sufficient to produce a theoretical osmolality of approximately 300 mOsm/kg.

A commercial Trypan Blue in PBS formulation was used as control. A similar sodium phosphate-based reformulation of Trypan Blue solution containing sodium chloride was used as a comparative reformulation. The prepared reformulations and control were each filtered (0.2 μm), subjected to three freeze-thaw cycles (2 h, −20° C.), and heated at 50° C. for five days. The osmolality of each prepared solution was measured following this temperature cycle (Table 2).

TABLE 1

Composition of example reformulations and controls according to Example 2.

| Compound | Control | Comparative reformulation (with Sodium chloride) | Example reformulation 1 (with Lithium chloride) | Example reformulation 2 (with D-Glucose) | Example reformulation 3 (with L-Glycine) |
|---|---|---|---|---|---|
| Water | 100.0000 g | 100.0000 g | 100.0000 g | 100.0000 g | 100.0000 g |
| Sodium chloride | 0.8239 g (14.1 mmol) | 0.8239 g (14.1 mmol) | n/a | n/a | n/a |
| D-Glucose | n/a | n/a | n/a | 5.0797 g | n/a |
| L-Glycine | n/a | n/a | n/a | n/a | 2.1166 g |
| Lithium chloride | n/a | n/a | 0.5977 g (14.1 mmol) | n/a | n/a |
| Potassium phosphate, dibasic | 0.0605 g (0.347 mmol) | n/a | n/a | n/a | n/a |
| Sodium phosphate, dibasic | n/a | 0.0493 g (0.347 mmol) | 0.0493 g (0.347 mmol) | 0.0493 g (0.347 mmol) | 0.0493 g (0.347 mmol) |
| Sodium azide | 0.0131 g (0.202 mmol) | 0.0131 g (0.202 mmol) | 0.0131 g (0.202 mmol) | 0.0131 g (0.202 mmol) | 0.0131 g (0.202 mmol) |
| Trypan Blue | * | 0.2000 g (0.229 mmol) | 0.2000 g (0.229 mmol) | 0.2000 g (0.229 mmol) | 0.2000 g (0.229 mmol) |
| Phosphoric acid | ** | ** | | ** | ** |
| Sodium hydroxide | ** | ** | | ** | ** |

* Trypan Blue added during manufacturing to meet spectrophotometric specifications.
** Phosphoric acid and sodium hydroxide added as needed to produce a final pH of 7.1 to 7.5.

TABLE 2

Osmolality of the Trypan Blue solutions according to Table 1.

| Formulation | Osmolality (mOsm $kg^{-1}$) |
|---|---|
| Control | 273 ± 2 |
| Comparative reformulation 1 (Sodium chloride) | 277 ± 1 |
| Example reformulation 1 (Lithium chloride) | 277 ± 2 |
| Example reformulation 2 (D-Glucose) | 303 ± 2 |
| Example reformulation 3 (L-Glycine) | 286 ± 2 |

Values reported as mean ± standard deviation of n = 3 replicate measurements.

The prepared and treated solutions were subsequently split into two portions and stored in separate bottles. These bottles were stored at either the ambient laboratory temperature of 22° C. or in a refrigerator at 4° C. For six weeks, the appearance by microscopic image, pH, and UV-vis absorbance of each solution were recorded at two-week intervals. After a total of 13 weeks, the final appearance by microscopic image, pH, and UV-vis absorbance of the solutions were recorded.

Figure 5:
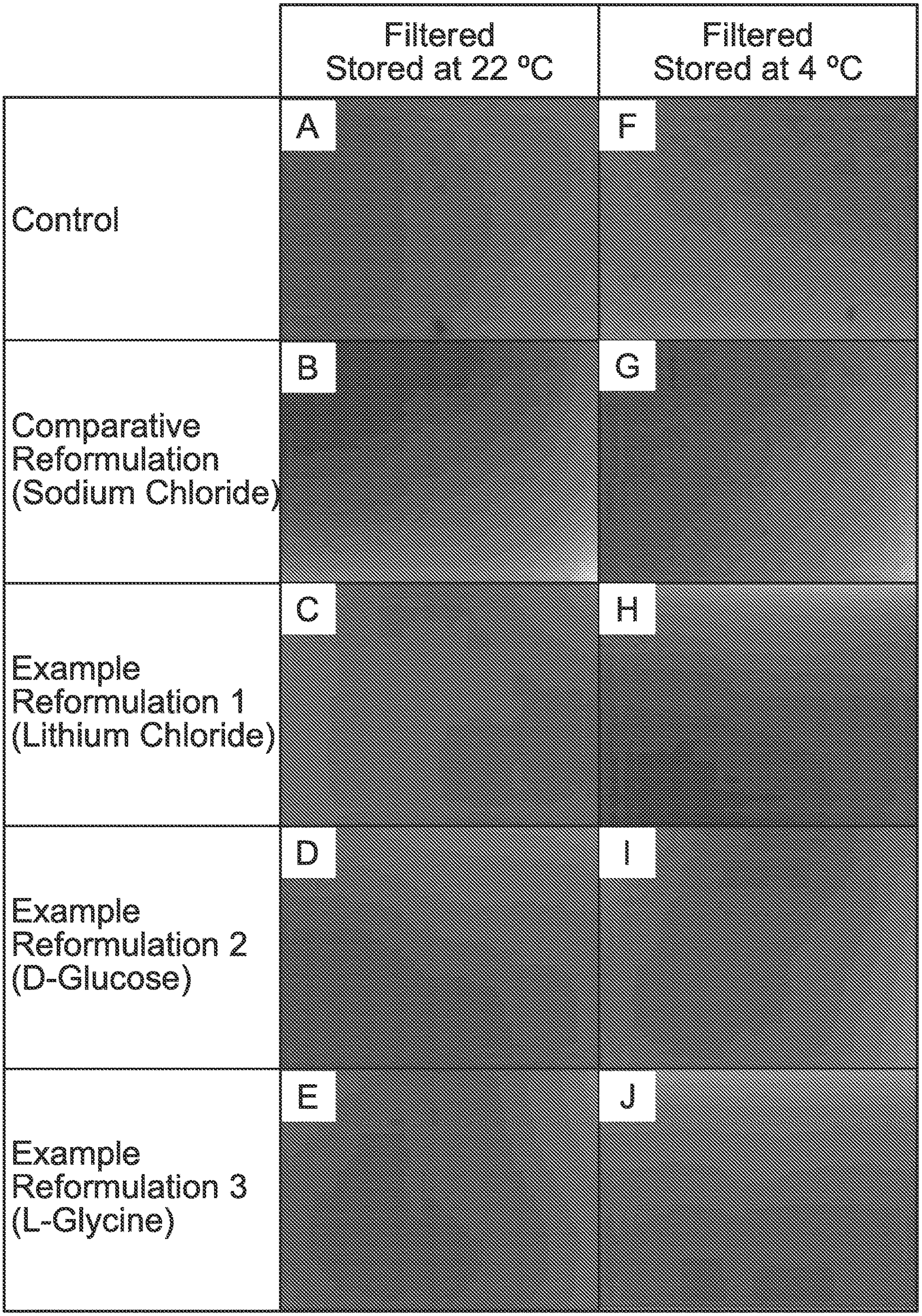
FIG. 5 shows microscopic images of Trypan Blue dye solutions after 13 weeks of storage at 22 or 4° C. Images A and F (labeled "Control") show commercial Trypan Blue in PBS; Images B and G (labeled "NaCl") show laboratory-prepared Trypan Blue in PBS; Images C and H (labeled "LiCl") show a laboratory-prepared lithium chloride formulation; Images D and I (labeled "D-Glucose") show a laboratory-prepared glucose formulation; Images E and J (labeled "L-Glycine") show a laboratory-prepared glycine formulation.

As shown in FIG. 5 (images C, D, E, H, I, and J) and Table 3, little-to-no dye aggregation was found in Example reformulations 1-3, after storage at 4 or 22° C. for 13 weeks. In contrast, the control (images A and F of FIG. 5) and the Comparative reformulation containing sodium chloride (images B and G of FIG. 5) exhibited significant dye aggregation. In the control and Comparative reformulation solutions, aggregates appeared within one week of storage at either 22 or 4° C. In contrast, the Example reformulation solutions containing lithium chloride, D-glucose, or L-glycine resisted dye aggregation even when refrigerated at 4° C., a temperature that was found to exacerbate aggregation for Trypan Blue solutions that are untreated. This result indicates that replacing sodium chloride in the Trypan Blue buffer formulation can reduce or eliminate the formation of dye aggregates.

TABLE 3

Inspection of Trypan Blue solutions over 13 weeks at 22 or 4° C.

| Formulation | Elapsed Time (weeks) 0 | 2 | 4 | 6 | 13 |
|---|---|---|---|---|---|
| Control | No aggregation | Aggregation | Aggregation | Aggregation | Aggregation |
| Comparative reformulation 1 (Sodium chloride) | No aggregation | Aggregation | Aggregation | Aggregation | Aggregation |
| Example reformulation 1 (Lithium chloride) | No aggregation | No aggregation | No aggregation | No aggregation | No aggregation |
| Example reformulation 2 (D-Glucose) | No aggregation | No aggregation | No aggregation | No aggregation | No aggregation |
| Example reformulation 3 (L-Glycine) | No aggregation | No aggregation | No aggregation | No aggregation | No aggregation |

The pH of each reformulation remained relatively stable over 13 weeks of storage at 22 or 4° C.

Figures 6A, 6B:
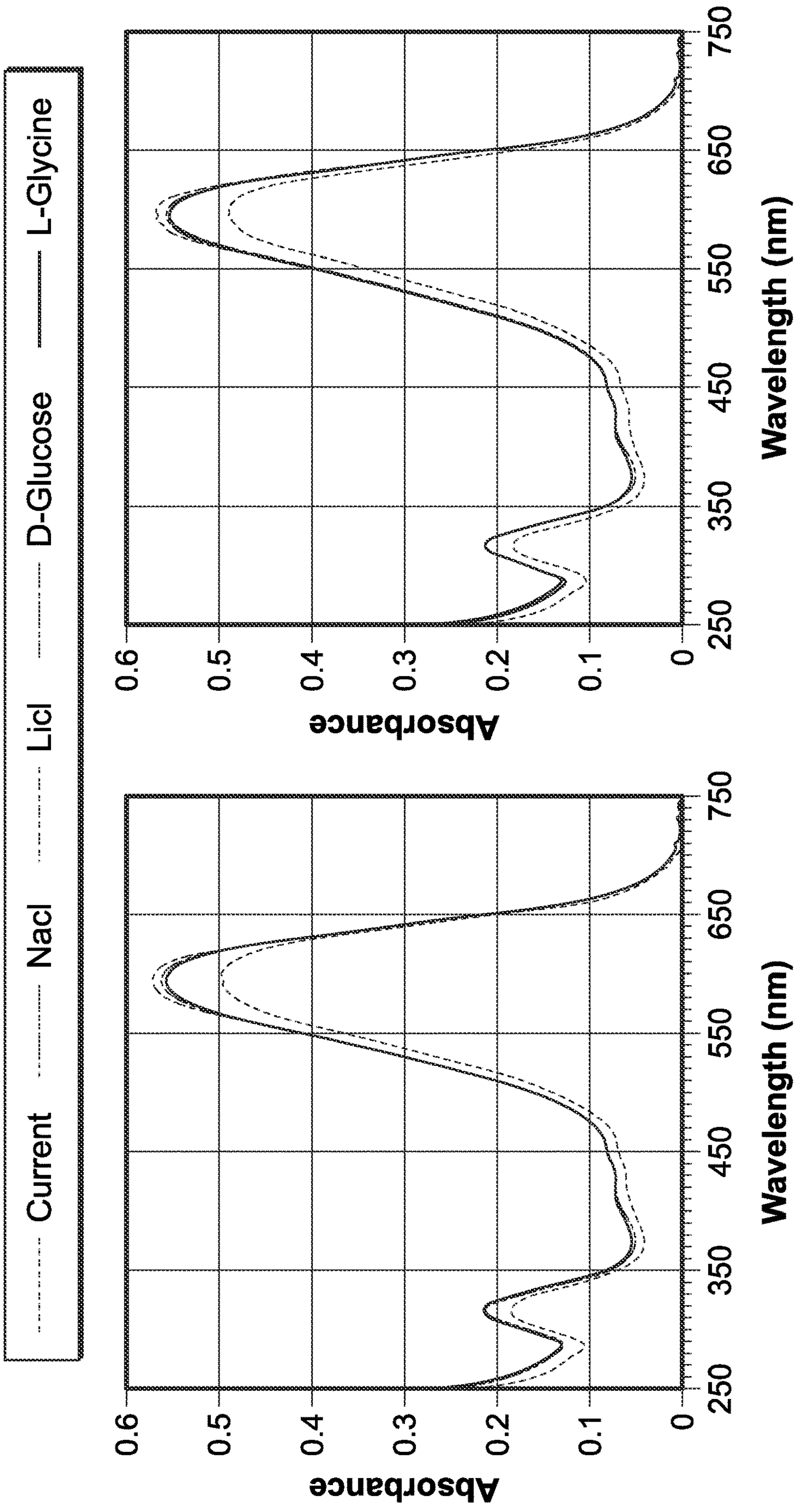
FIG. 6 shows UV-Vis absorbance spectra of Trypan Blue solutions after storage at (a) an ambient temperature of 22° C. or (b) refrigerated at 4° C.

As shown in FIG. 6, all Example reformulations exhibit an approximate 12% increase in absorbance at 600 nm compared with the control, which clearly indicates an increase of soluble Trypan Blue in the Examples reformulations as compared to the control. These comparative results further support that the treatment of the Trypan Blue solutions was effective to stabilize the Trypan Blue and maximize the soluble Trypan Blue in the solutions. Without wishing to be bound to any particular theory, it is believed that Trypan Blue solution treated by the present methods could remove the impurities that otherwise provide a nuclei to initiate and promote aggregation in the Trypan Blue solution.

In addition, the absorbance of the solutions at 600 nm is stable over 13 weeks of storage at 22 or 4° C., which further supports that replacement of sodium chloride had no substantial impact on the spectroscopic characteristics of Trypan Blue.

Cell viability performance of Example reformulation 1 (containing lithium chloride) and the control (containing sodium chloride) was performed using a Vi-CELL BLU instrument (Beckman Coulter) and Chinese hamster ovary (CHO) cells, and the results are compared and summarized in Table 4.

TABLE 4

Comparative results from cell viability test of Example reformulation 1 and control.

| Parameter | Control | Lithium Chloride | Difference (%) | P value |
|---|---|---|---|---|
| Cell count | 15543 ± 649 | 15921 ± 1050 | 2.4 | 424 |
| Viable cells | 14741 ± 621 | 15196 ± 1019 | 3.1 | .327 |
| Total ($\times 10^6$) cells per mL | 5.72 ± 0.30 | 5.92 ± 0.39 | 3.5 | .295 |
| Viable ($\times 10^6$) cells per mL | 5.48 ± 0.23 | 5.65 ± 0.38 | 3.1 | .329 |
| Viability (%) | 94.8 ± 0.3 | 95.4 ± 0.2 | 0.6 | .005 |
| Average diameter (μm) | 16.03 ± 0.11 | 16.02 ± 0.12 | −0.1 | .868 |
| Average viable diameter (μm) | 16.23 ± 0.11 | 16.18 ± 0.11 | −0.3 | 423 |
| Average circularity | 0.91 ± 0.01 | 0.92 ± 0.01 | 0.7 | .067 |
| Average viable circularity | 0.92 ± 0.00 | 0.92 ± 0.00 | 0.0 | n/a |
| Average cells per image | 155 ± 6 | 159 ± 11 | 2.3 | .443 |
| Average background intensity | 133 ± 2 | 134 ± 1 | 0.6 | .295 |
| LED power | 17.09 ± 0.44 | 19.31 ± 0.38 | 13.0 | <.001 |

Values reported as mean and 95% confidence interval of n = 5 replicate measurements.

Statistical analysis performed using two-tailed Welch's unequal variances t-test at the 95% confidence level ($\alpha$ = 0.05).

As shown in Table 4, the comparative results do not support gross dissimilarity in behavior between Example reformulation 1 and the control. The largest difference in an individual parameter was observed for LED power, which increased by 13% to account for the greater absorbance of the Example reformulation 1 containing lithium chloride.

Example 3—Dye Precipitation in Cell Culture Media Containing Trypan Blue

Trypan Blue (also known as Direct Blue 14) is a water-soluble azo dye derived from o-tolidine and commonly sold in the sodium tetrasulfonate form. The chemical structure of Trypan Blue contains four sulfonic acid groups ($—SO_3H$) that are predominantly deprotonated at mildly acidic to basic pH to form negatively charged sulfonate groups ($—SO_3^-$). As a consequence, the Trypan Blue molecule bears a net negative charge within the pH range relevant to cell culture applications.

Cell culture media are chemically complex mixtures that commonly include salts, pH buffers, amino acids, vitamins, proteins, and sugars. Antibiotics, supplements, and other additives may also be included in the formulation of cell culture media. Positively charged polyamines such as spermine and spermidine or aminoglycoside antibiotics such as streptomycin, geneticin (G418), kanamycin, gentamycin, and neomycin may also be components of particular cell culture medium formulations. Certain antibiotics may be purposefully added to cell culture media as selection agents to select for genetically modified, antibiotic-resistant cells.

Positively charged cell culture media constituents may interact with Trypan Blue to cause dye precipitation. This may occur through the formation of polyelectrolyte complexes. A polyelectrolyte complex results from the association of a positively charged chemical species with a negatively charged counterpart. The cationic (positively charged) and anionic (negatively charged) components of the complex are bound together by electrostatic interactions. Polyelectrolyte complexes may be less soluble than either of the parent species or altogether insoluble.

Certain classes of positively charged cell culture media additives are known to form insoluble polyelectrolyte complexes with Trypan Blue or chemical analogs of Trypan Blue. For example, Evans Blue is a positional isomer of Trypan Blue that forms an insoluble blue precipitate with neomycin, a polycationic aminoglycoside (Anal. Sci. 2017, 33, 499-504). The precipitate is insoluble at pH 8.5, but dissolves at pH 10.4. Neomycin has reported pKa values of 5.7 and 7.6-8.8, indicating that the compound will predominantly exist in the positively charged, cationic form at pH 8.5 and in the neutral, non-cationic form at pH of 10.4. At pH of 10.4, neomycin is not positively charged, therefore the polyelectrolyte complex with Evans Blue is not stable and the precipitate dissolves.

Figure 7:
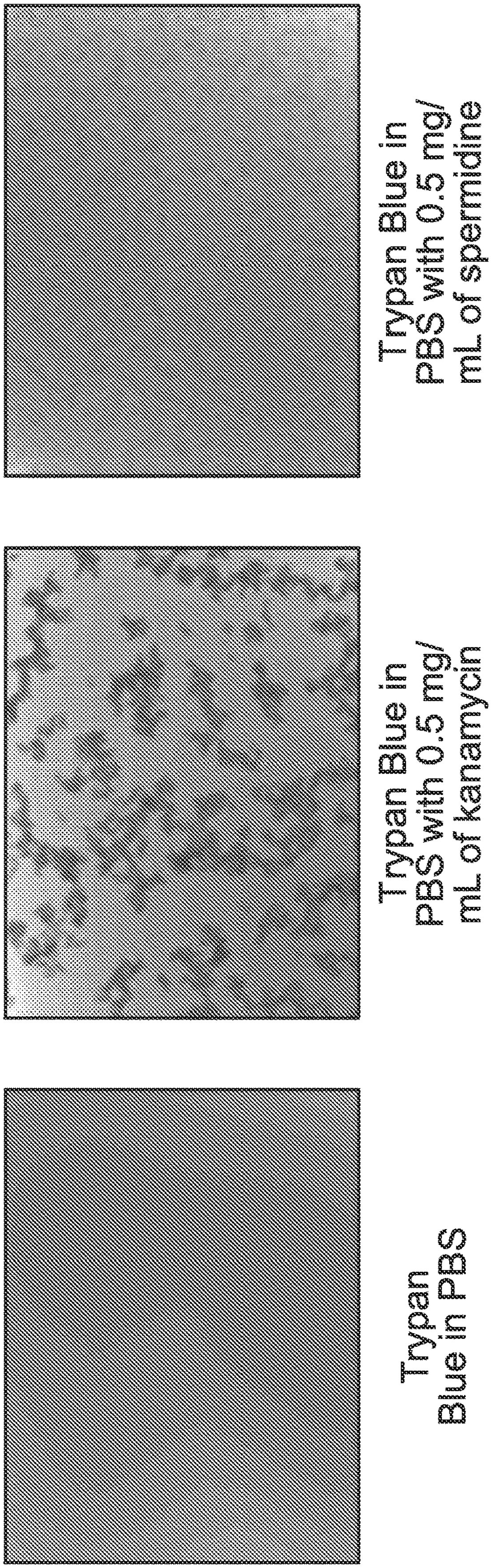
FIG. 7 shows microscopic images of mixtures of (1) Nominal 0.4% Trypan Blue in NaCl (0.20 mL) and PBS (0.20 mL), (2) Nominal 0.4% Trypan Blue in NaCl (0.20 mL) and 0.5 mg $mL^{-1}$ kanamycin in PBS (0.20 mL), and (3) Nominal 0.4% Trypan Blue in NaCl (0.20 mL) and 0.5 mg $mL^{-1}$ spermidine in PBS (0.20 mL).

In the present study, Trypan Blue was mixed with various cell culture medium containing polycationic compounds. Nominal 0.4% Trypan Blue in NaCl was mixed with PBS (negative control), kanamycin (a positively charged aminoglycoside), and spermidine (a positively charged polyamine). As shown in FIG. 7, both kanamycin and spermidine trigger immediate precipitation of Trypan Blue. This effect can be reasonably generalized to other polycationic compounds, particularly those containing amine functional groups.

Example 4—Effect of Polymer Additives on Stabilization of Trypan Blue Solutions In the present study, the ability of polymer additives to inhibit cell culture media-triggered Trypan Blue precipitation was investigated. A variety of polymers were dissolved in Nominal 0.4% Trypan Blue in NaCl (Table 5). A total of 24 examples were prepared to represent six different polymers at four different concentrations in this study. The compositions of the 24 examples are summarized in Table 6. Polymers consist of chains of repeating units derived from monomers. Each repeating unit contains one or more chemical functional groups that may bind to cationic species or dyes. The mass of each polymer additive was calculated to produce equal molar repeating unit concentrations in the dye solution. This results in a different percent weight-by-volume (% w/v) concentration for each polymer, since the repeating unit molecular weights are different.

TABLE 5

Polymer additives used in Example 4.

| Name | Abbre-viation | Nominal Molecular Weight (g/mol) | Repeating Unit Molecular Weight (g/mol) | Category |
|---|---|---|---|---|
| Poly (acrylic acid sodium salt) | Na-PAA | 5,100 | 94.04 | Anionic |
| Poly (sodium 4-styrene sulfonate) | Na-PSS | 70,000 | 206.19 | Anionic |
| Alginic acid, sodium salt from brown algae | Na-Alg | Not reported | 226.20 | Anionic |
| Poly (ethylene glycol) | PEG | 10,000 | 44.05 | Non-ionic |
| Poly (vinyl alcohol), 80% hydrolyzed | PVA | 9,000 to 10,000 | 52.46 | Non-ionic |
| Poly (vinyl pyrrolidone) | PVP | 40,000 | 111.14 | Non-ionic |

TABLE 6

Example Trypan Blue solutions containing polymer additives according to Example 4.

| | Polymer additive | Polymer additive concentration (% w/v) | Repeating unit concentration (mol/L) | Nominal Trypan Blue concentration (mol/L) | Ratio (Repeating Unit to Trypan Blue) |
|---|---|---|---|---|---|
| Example A-1 | Na-PAA | 1.00 | $1.1 \times 10^{-1}$ | $2.1 \times 10^{-3}$ | 51 |
| Example A-2 | Na-PAA | 0.50 | $5.3 \times 10^{-2}$ | $2.1 \times 10^{-3}$ | 26 |
| Example A-3 | Na-PAA | 0.10 | $1.1 \times 10^{-2}$ | $2.1 \times 10^{-3}$ | 5 |
| Example A-4 | Na-PAA | 0.05 | $5.3 \times 10^{-3}$ | $2.1 \times 10^{-3}$ | 3 |
| Example B-1 | Na-PSS | 2.19 | $1.1 \times 10^{-1}$ | $2.1 \times 10^{-3}$ | 51 |
| Example B-2 | Na-PSS | 1.10 | $5.3 \times 10^{-2}$ | $2.1 \times 10^{-3}$ | 26 |
| Example B-3 | Na-PSS | 0.22 | $1.1 \times 10^{-2}$ | $2.1 \times 10^{-3}$ | 5 |
| Example B-4 | Na-PSS | 0.11 | $5.3 \times 10^{-3}$ | $2.1 \times 10^{-3}$ | 3 |
| Example C-1 | Na-Alg | 2.41 | $1.1 \times 10^{-1}$ | $2.1 \times 10^{-3}$ | 51 |
| Example C-2 | Na-Alg | 1.20 | $5.3 \times 10^{-2}$ | $2.1 \times 10^{-3}$ | 26 |
| Example C-3 | Na-Alg | 0.24 | $1.1 \times 10^{-2}$ | $2.1 \times 10^{-3}$ | 5 |
| Example C-4 | Na-Alg | 0.12 | $5.3 \times 10^{-3}$ | $2.1 \times 10^{-3}$ | 3 |
| Example D-1 | PEG | 0.47 | $1.1 \times 10^{-1}$ | $2.1 \times 10^{-3}$ | 51 |
| Example D-2 | PEG | 0.23 | $5.3 \times 10^{-2}$ | $2.1 \times 10^{-3}$ | 26 |
| Example D-3 | PEG | 0.05 | $1.1 \times 10^{-2}$ | $2.1 \times 10^{-3}$ | 5 |
| Example D-4 | PEG | 0.02 | $5.3 \times 10^{-3}$ | $2.1 \times 10^{-3}$ | 3 |
| Example E-1 | PVA | 0.56 | $1.1 \times 10^{-1}$ | $2.1 \times 10^{-3}$ | 51 |
| Example E-2 | PVA | 0.28 | $5.3 \times 10^{-2}$ | $2.1 \times 10^{-3}$ | 26 |
| Example E-3 | PVA | 0.06 | $1.1 \times 10^{-2}$ | $2.1 \times 10^{-3}$ | 5 |
| Example E-4 | PVA | 0.03 | $5.3 \times 10^{-3}$ | $2.1 \times 10^{-3}$ | 3 |
| Example F-1 | PVP | 1.18 | $1.1 \times 10^{-1}$ | $2.1 \times 10^{-3}$ | 51 |
| Example F-2 | PVP | 0.59 | $5.3 \times 10^{-2}$ | $2.1 \times 10^{-3}$ | 26 |
| Example F-3 | PVP | 0.12 | $1.1 \times 10^{-2}$ | $2.1 \times 10^{-3}$ | 5 |
| Example F-4 | PVP | 0.06 | $5.3 \times 10^{-3}$ | $2.1 \times 10^{-3}$ | 3 |

The polymer concentrations were arbitrarily selected to represent four distinct levels at 1.00, 0.50, 0.10, and 0.05% w/v for Na-PAA. Na-PAA was chosen to define the concentration range because it is the anionic polymer with the lowest repeating unit mass. This concentration range limits the amount of dissolved polymer in the dye solution. At all concentrations, the repeating unit concentration (mol/L) is in excess of the nominal Trypan Blue concentration (with a ratio more than 1). The concentration of cationic species in proprietary cell culture media formulations is not known and may vary by product and manufacturer.

Poly(acrylic acid), poly(styrene sulfonate), and alginic acid are polymers that were used to test the hypothesis that anionic polymers will inhibit or prevent cell culture media-triggered dye precipitation. These polymers were used in the form of the water-soluble, anionic sodium salts poly(acrylic acid, sodium salt) (Na-PAA), poly(sodium 4-styrene sulfonate) (Na-PSS), and sodium alginate (Na-Alg). In aqueous solution, the polymers bear anionic carboxylate or sulfonate groups that are counterbalanced by sodium cations.

Poly(vinyl alcohol) (PVA) and poly(vinyl pyrrolidone) (PVP) are non-ionic polymers that are known to bind Trypan Blue-like azo dyes or are likely to bind dyes. Poly(ethylene glycol) (PEG) is a non-ionic polymer that is less likely to bind or otherwise interact with Trypan Blue.

Each of the 24 Example solution according to Table 6 was mixed with Gibco™ CD FortiCHO™ Medium. The dye precipitation for each sample mixed with the cell culture medium was qualitatively assessed with microscopy, and the microscopy results were summarized in FIG. 8. The positive control consisted of Nominal 0.4% Trypan Blue in NaCl (without polymer additives) mixed with the cell culture medium. As expected, this combination resulted in significant cell culture medium-triggered precipitation that occurred immediately after mixture.

The negative control consisted of Nominal 0.4% Trypan Blue in NaCl (without polymer additives) mixed with PBS. This combination did not result in Trypan Blue precipitation. However, there was frequently dye precipitate already present in Nominal 0.4% Trypan Blue in NaCl when the product was received. Consequently, varying levels of dye precipitate are present in certain images of the negative control.

Figure 8:
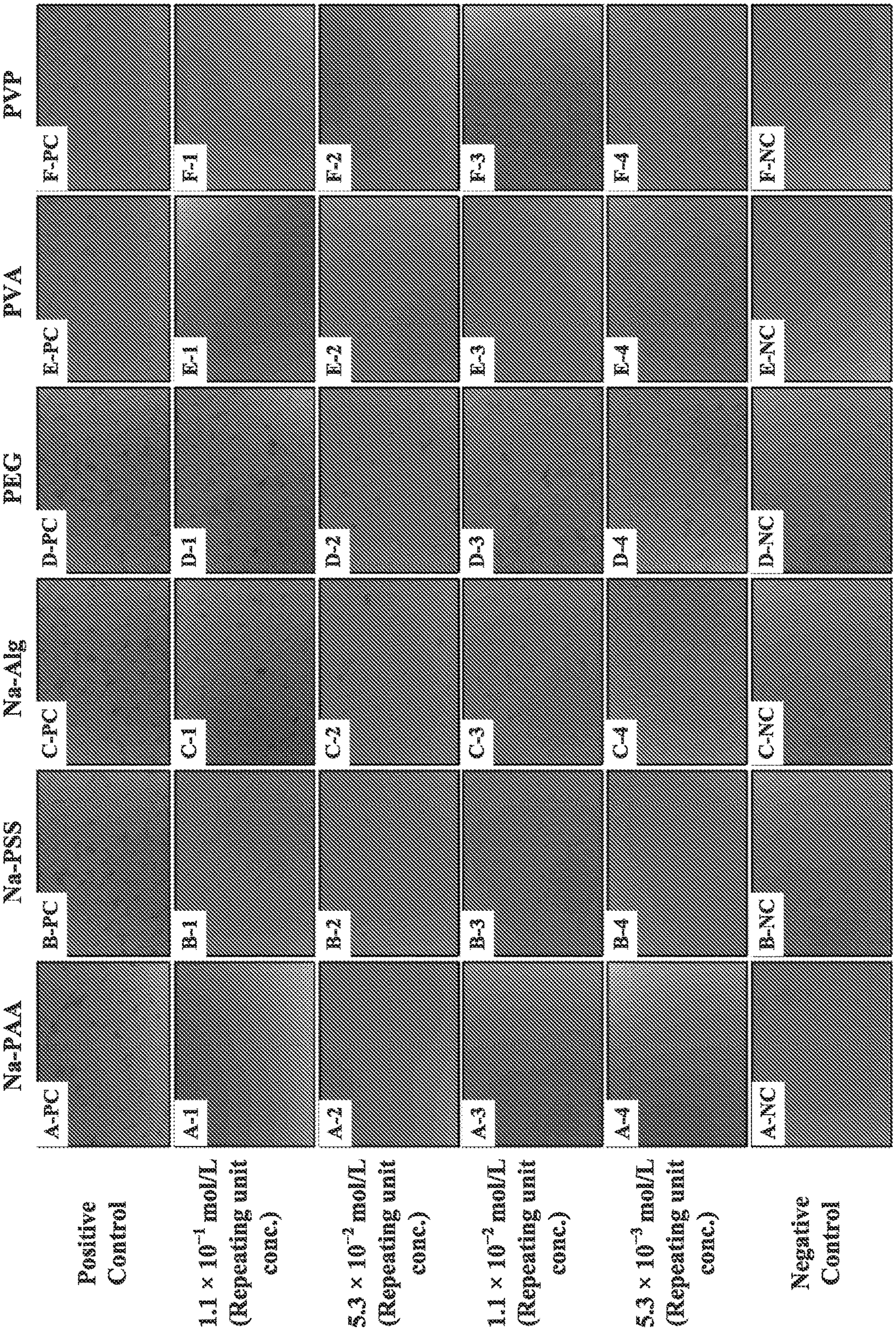
FIG. 8 shows microscopic images of mixtures of Trypan Blue solutions and cell culture media according to Table 6 and Example 4. Images depict the result of combining 0.20 mL of Nominal 0.4% Trypan Blue in NaCl (with or without polymer additives) with 0.20 mL of Gibco™ CD FortiCHO™ Medium or PBS. PC=Positive Control=Nominal 0.4% Trypan Blue in NaCl and Gibco™ CD FortiCHO™ Medium. NC=Negative Control=Nominal 0.4% Trypan Blue in NaCl and PBS.

As shown in FIG. 8, all four Examples (A-1 to A-4) containing 0.05 to 1.00% w/v Na-PAA noticeably prevented the formation of dye precipitate when the Trypan Blue solution was mixed with the cell culture medium. Similarly, four Examples (B-1 to B-4) containing 0.11 to 2.19% w/v Na-PSS prevented the formation of new dye precipitate relative to the positive control. This protective effect was temporary, and extended exposure to cell culture media (>10 min) gradually resulted in the appearance of Trypan Blue precipitate at low polymer concentrations. However, dye exclusion testing occurred over a relatively short period of time. Therefore, a permanent protective effect is not required or targeted in this study.

In contrast, Examples C-1 to C-4 containing 0.12 to 2.41% w/v Na-Alg did not prevent dye precipitation, although the severity was reduced relative to the positive control. This outcome was attributable to the fact that Na-Alg was poorly soluble in Nominal 0.4% Trypan Blue in NaCl. The gel-like, insoluble fraction of Na-Alg became stained with Trypan Blue and appeared to promote precipitation of dye. The degree of apparent polymer staining or dye precipitation worsened as the concentration of Na-Alg increased. Trypan Blue is a known stain for cotton textiles, which are largely composed of the polysaccharide cellulose. Na-Alg is also a polysaccharide, which may result in affinity for Trypan Blue. These results suggest that the polymer additives are preferred to have relatively high solubility and not prone to strong interactions with Trypan Blue when used to stabilize Trypan Blue solutions.

Examples D-1 to D-4 containing PEG at concentrations of 0.02 to 0.47% w/v did not appear to prevent or inhibit dye precipitation. This result may indicate that PEG has low affinity for cationic polyamines and Trypan Blue. PEG and other neutral polymers that do not donate hydrogen bonds are less likely to interact with charged organic compounds. In comparison, Examples E-1 to E-4 containing PVA were found to prevent or inhibit dye precipitation at concentrations of 0.03 to 0.56% w/v. Although PVA is non-ionic and does not form polyelectrolyte complexes, it is both a hydrogen bond donor and acceptor. These properties may allow it to bind either Trypan Blue or cationic polyamines in the cell culture medium.

Examples F-1 to F-4 containing PVP were found to prevent dye precipitation at concentrations of 0.59 and 1.18% w/v, while modest inhibition occurs at 0.06 and 0.12% w/v. This performance can be attributed to concentration-dependent binding of Trypan Blue by the N-alkyl pyrrolidone repeating units of PVP (*Bull. Chem. Soc. Jpn.* 1989, 62, 295-303). This binding may be facilitated by charge separation in N-alkyl pyrrolidone units due to amide-imide tautomerism. This mode of inhibition may be less desirable than binding of cationic cell culture medium constituents, because it may reduce availability of the dye or cause changes in its absorbance properties.

Figure 9:
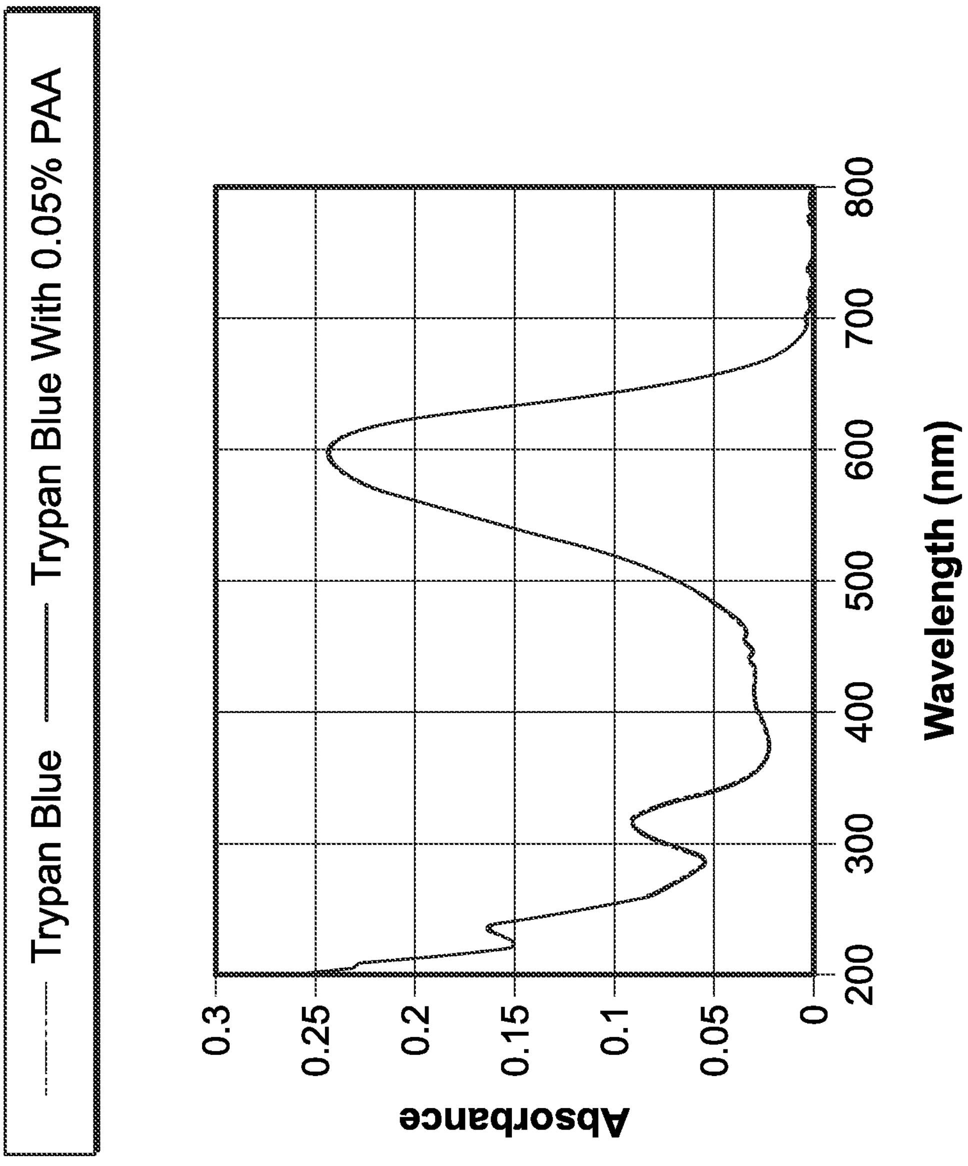
FIG. 9 shows UV-Vis absorbance spectra of Nominal 0.4% Trypan Blue in NaCl and Nominal 0.4% Trypan Blue in NaCl containing 0.05% w/v Na-PAA according to Example 4.

Due to the particularly favorable behavior of Na-PAA at low concentration, Nominal 0.4% Trypan Blue in NaCl containing 0.05% w/v Na-PAA was subjected to further testing. As depicted in FIG. 9, the addition of 0.05% w/v Na-PAA did not alter the absorbance properties of Trypan Blue. Because dye exclusion testing relies on optical identification of stained cells in a dye-rich medium, it is important that the color and relative opacity of the dye remain unchanged by polymer additives.

The Vi-CELL BLU Cell Viability Analyzer was used to perform dye exclusion testing using Nominal 0.4% Trypan Blue in NaCl both with and without 0.05% Na-PAA. Chinese hamster ovary (CHO) cells were exposed to the Trypan Blue solution containing 0.05% Na-PAA as well as a control that lacked any polymer additives. The cell viability results were summarized in Table 7.

TABLE 7

Cell viability results according to Example 4.

| Dye Solution | Total Cell Concentration (cells $mL^{-1}$) | Viable Cell Concentration (cells $mL^{-1}$) | Viability (%) | Average Diameter (μm) |
|---|---|---|---|---|
| Trypan Blue | $4.38 \pm 0.44 \times 10^6$ | $4.26 \pm 0.43 \times 10^6$ | $97.3 \pm 0.2$ | $14.8 \pm 0.1$ |
| Trypan Blue with 0.05% w/v Na-PAA | $4.61 \pm 0.29 \times 10^6$ | $4.49 \pm 0.29 \times 10^6$ | $97.4 \pm 0.2$ | $14.2 \pm 0.2$ |

As shown in Table 7, the percent viability of cells is not adversely impacted by the presence of 0.05% w/v Na-PAA. The hypothesis that the mean results for Trypan Blue and Trypan Blue with 0.05% w/v Na-PAA are equal was tested using Welch's unequal variances t-test ($\alpha=0.05$). This hypothesis was not rejected for total cell concentration, viable cell concentration, and percent viability, supporting that 0.05% Na-PAA does not impact cell viability. This hypothesis was rejected ($p<0.001$) for average diameter, which may indicate an impact to the osmotic balance of the solution. Changes to osmolarity are expected with any soluble additive and can be corrected with minor formulation adjustments.

The following numbered clauses define further example aspects and features of the compositions, methods, and techniques of the present disclosure:

1. A Trypan Blue solution comprising: Trypan Blue, an osmolyte, and an aqueous buffer.
2. The Trypan Blue solution of clause 1, wherein the Trypan Blue solution has a concentration of Trypan Blue from about 0.01% to about 2%, based on the total weight (in the unit of w/w %) or total volume (in the unit w/v %) of the Trypan Blue solution.
3. The Trypan Blue solution of any one of clauses 1-2, wherein the osmolyte is not a sodium salt.
4. The Trypan Blue solution of any one of clauses 1-3, wherein the osmolyte is selected from the group consisting of: lithium chloride, D-glucose, L-glycine, or combinations thereof.
5. The Trypan Blue solution of any one of clauses 1-4, further comprising an acid or a base.
6. The Trypan Blue solution of clause 5, wherein the acid comprises phosphoric acid.
7. The Trypan Blue solution of clause 5, wherein the base comprises alkali hydroxide.
8. The Trypan Blue solution of any one of clauses 1-7, wherein the buffer is a sodium azide preserved PBS buffer.
9. The Trypan Blue solution of any one of clauses 1-8, further comprising a water-soluble polymer.
10. The Trypan Blue solution of clause 9, wherein the water-soluble polymer is selected from the group of: poly(acrylic acid) or a salt thereof, poly(styrene sulfonate) or a salt thereof, poly(vinyl pyrrolidone), or any combinations thereof.
11. The Trypan Blue solution of any one of clauses 9-10, wherein the Trypan Blue solution has a concentration of water-soluble polymer from about 0.05% to about 4%, based on the total weight (w/w %) or total volume (w/v %) of the Trypan Blue solution.

12. The Trypan Blue solution of any one of clauses 9-11, wherein the Trypan Blue solution has a repeating unit concentration of the water-soluble polymer from about 5 mmol/L to about 500 mmol/L.
13. The Trypan Blue solution of any one of clauses 9-12, wherein the Trypan Blue solution has a molar ratio of repeating unit of the water-soluble polymer to Trypan Blue from about 1 to about 55.
14. The Trypan Blue solution of any one of clauses 9-13, wherein the water-soluble polymer is a poly(acrylic acid) or an alkali salt thereof with an average molecular weight from about 4,000 to about 6,000 g/mol.
15. The Trypan Blue solution of any one of clauses 9-13, wherein the water-soluble polymer is a poly(4-styrene sulfonate) or an alkali salt thereof with an average molecular weight from about 50,000 to about 80,000 g/mol.
16. The Trypan Blue solution of any one of clauses 9-13, wherein the water-soluble polymer is a poly(vinyl pyrrolidone) with an average molecular weight from about 30,000 to about 50,000 g/mol.
17. The Trypan Blue solution of any one of clauses 1-16, further comprising a cell culture medium.
18. The Trypan Blue solution of any one of clauses 1-17, wherein the Trypan Blue solution has a pH from about from about 7.0 to about 7.5.
19. The Trypan Blue solution of any one of clauses 1-18, wherein the Trypan Blue solution has an osmolality from about 270 to about 310 mOsm $kg^{-1}$.
20. The Trypan Blue solution of any one of clauses 1-19, wherein the Trypan Blue solution is free or substantially free of precipitated impurities after storing for at least about 10 minutes at ambient temperature.
21. A method for making a stable Trypan Blue solution, the method comprising: providing a solution of Trypan Blue; and adding a water-soluble polymer to the solution of Trypan Blue.
22. The method of clause 21, wherein the water-soluble polymer is selected from the group of: poly(acrylic acid) or a salt thereof, poly(styrene sulfonate) or a salt thereof, poly(vinyl pyrrolidone), or any combinations thereof.
23. The method of any one of clauses 21-22, further comprising adjusting Trypan Blue concentration to a range from about 0.01% to about 2%, based on the total weight (in the unit of w/w %) or total volume (in the unit w/v %) of the Trypan Blue solution.
24. The method of any one of clauses 21-23, further comprising adjusting a molar ratio of repeating unit of the water-soluble polymer to Trypan Blue from about 1 to about 55.
25. The method of any one of clauses 21-24, further comprising filtering the Trypan Blue solution before, or after adding the water-soluble polymer.
26. The method of clause 25, wherein the filtration is performed through use of at least one filtration medium with an average pore size of about 0.2 μm.
27. The method of any one of clauses 25-26, further comprising: cooling the Trypan Blue solution before the filtration step.
28. The method of clause 27, wherein the cooling step is performed before, after, or before and after adding the water-soluble polymer.
29. The method of any one of clauses 27-28, wherein the Trypan Blue solution is cooled to a temperature of about 0° C. to about 14° C.
30. The method of any one of clauses 27-29, wherein the Trypan Blue solution is cooled for at least about 1 hour.
31. The method of any one of clauses 21-30, further comprising mixing Trypan Blue with at least one ingredient selected from: an osmolyte, an acid, a base, a pH modifier, a buffer solution, a cell culture medium, water, or any combinations thereof.
32. The method of any one of clauses 21-31, further comprising adjusting the pH of the Trypan Blue solution to a range from about 6.5 to about 8.
33. The method of any one of clauses 27-32, further comprising adjusting the pH of the Trypan Blue solution to about 6 to about 7 before or during the cooling step.
34. The method of clause 33, further comprising adjusting the pH of the Trypan Blue solution to about 7 to about 7.5 after the filtration step.
35. The method of any one of clauses 21-34, further comprising adjusting osmolality of the Trypan Blue solution to a range from about 270 to about 310 mOsm $kg^{-1}$.
36. The method of any one of clauses 21-35, further comprising repeating the cooling and/or the filtration step.
37. The method of any one of clauses 21-36, further comprising packaging the filtered Trypan Blue solution.
38. A method for preparing a stable Trypan Blue solution, the method comprising: cooling a solution of Trypan Blue; and filtering the cooled solution.
39. The method of clause 38, further comprising mixing the solution of Trypan Blue with one or more ingredients selected from: an osmolyte, an acid, a base, a pH modifier, a cell culture medium, water, or any combinations thereof.
40. The method of any one of clauses 38-39, wherein the stable Trypan Blue solution has a concentration of Trypan Blue from about 0.01% to about 2%, based on the total weight (in the unit of w/w %) or total volume (in the unit w/v %) of the Trypan Blue solution.
41. The method any one of clauses 39-40, wherein the osmolyte is not a sodium salt.
42. The method of any one of clauses 39-41, wherein the osmolyte is selected from the group consisting of: lithium chloride, D-glucose, L-glycine, or combinations thereof.
43. The method of any one of clauses 39-42, wherein the acid comprises phosphoric acid.
44. The method of any one of clauses 39-42, wherein the base comprises alkali hydroxide.
45. The method of any one of clauses 38-44, wherein the buffer is a sodium azide preserved PBS buffer.
46. The method of any one of clauses 38-45, wherein the Trypan Blue is at a concentration near, at, or beyond the solubility limit in the solution prior to cooling.
47. The method of any one of clauses 38-46, wherein the solution of Trypan Blue is made by mixing Trypan Blue with an aqueous buffer at ambient or near-ambient temperature and pressure prior to cooling.
48. The method of any one of clauses 38-47, further comprising mixing a water-soluble polymer with the solution of Trypan Blue before cooling or after filtration.

49. The method of any one of clauses 38-48, further comprising adjusting the pH of the Trypan Blue solution.
50. The method of clause 49, further comprising adjusting the pH of the Trypan Blue solution to about 6 to about 7 before or during the cooling step.
51. The method of clause 50, further comprising adjusting the pH of the Trypan Blue solution to about 7 to about 7.5 after the filtration step.
52. The method of any one of clauses 38-51, further comprising adjusting osmolality of the Trypan Blue solution to a range from about 270 to about 310 mOsm $kg^{-1}$.
53. The method of any one of clauses 38-52, further comprising repeating the cooling and/or the filtration step.
54. The method of any one of clauses 38-53, further comprising packaging the filtered Trypan Blue solution.
55. The method of any one of clauses 38-54, further comprising further comprising storing the filtered Trypan Blue solution.
56. The method of clause 55, wherein the filtered Trypan Blue solution is stored at a temperature from about 0° C. to about 25° C.
57. The method of any one of clauses 38-56, wherein the filtered Trypan Blue solution is free or substantially free of precipitated impurities after storing for at least about 10 minutes at ambient temperature.
58. A method for cell staining, the method comprising: making a stable Trypan Blue solution according to any one of clauses 21-57; combining the stable Trypan Blue solution with a cell culture medium; and contacting the combined solution with a sample of cells.
59. A kit for performing the method according to any one of the clauses 21-58, the kit comprising: a Trypan Blue solution; and at least one filtration medium.
60. The kit of clause 59, further comprising a water-soluble polymer stored in a separate container.
61. A kit for performing the method according to any one of the clauses 21-58, the kit comprising: a Trypan Blue solution stored in a first container; a water-soluble polymer stored in a second container.
62. The kit of clause 61, further comprising a filtration medium.

All of the compositions and methods disclosed and claimed herein can be made and executed without undue experimentation in light of the present disclosure. While the compositions and methods of this disclosure have been described in terms of the foregoing illustrative embodiments, it will be apparent to those of skill in the art that variations, changes, modifications, and alterations may be applied to the compositions, ingredients, Trypan Blue solutions, methods, and in the steps or in the sequence of steps of the methods described herein, without departing from the true concept, spirit, and scope of the disclosure. More specifically, it will be apparent that certain agents, additives, and ingredients that are similar according to their physical, or chemical properties may be substituted for the agents, additives and ingredients described herein while the same or similar results would be achieved. All such similar substitutes and modifications apparent to those skilled in the art are deemed to be within the spirit, scope, and concept of the disclosure as defined by the hereinafter appended claims.

What is claimed is:

1. A method for preparing a stable Trypan Blue solution, the method comprising:
(a) cooling a solution of Trypan Blue to a temperature of less than 15° C.; and
(b) filtering the cooled solution from step (a).

2. The method of claim 1, further comprising filtering the solution of Trypan Blue at ambient temperature and pressure before step (a).

3. The method of claim 1, wherein the solution comprises sodium azide preserved phosphate buffered saline.

4. The method of claim 1, wherein the sodium azide preserved phosphate buffered saline is added to the solution before step (a), during step (a), or after step (a).

5. The method of claim 1, wherein the solution of Trypan Blue is cooled to a temperature less than about 5° C.

6. The method of claim 1, wherein the solution of Trypan Blue is cooled to a temperature of about 0° C. to about 14° C.

7. The method of claim 1, wherein the Trypan Blue is at a concentration near, at, or beyond the solubility limit in the solution.

8. The method of claim 1, wherein the solution of Trypan Blue is made by mixing Trypan Blue with an aqueous buffer at ambient or near-ambient temperature and pressure before cooling.

9. The method of claim 1, further comprising adding a water-soluble polymer to the Trypan Blue solution prior to cooling and/or after filtering, wherein the water-soluble polymer is selected from the group of: poly(acrylic acid) or a salt thereof, poly(styrene sulfonate) or a salt thereof, poly(vinyl pyrrolidone), or any combinations thereof.

10. The method of claim 9, wherein the Trypan Blue solution has a molar ratio of repeating unit of the water-soluble polymer to Trypan Blue from about 1 to about 55.

11. The method of claim 1, further comprising storing the filtered Trypan Blue solution at a temperature from about 0° C. to about 50° C., or about 10° C. to about 40° C., or about 0° C. to about 25° C.

12. The method of claim 1, wherein the filtered Trypan Blue solution is free or substantially free of precipitated impurities after storing for at least about 10 minutes at a temperature of about 0° C. to about 50° C., or about 10° C. to about 40° C., or about 15° C. to about 30° C.

13. The method of claim 1, wherein a water-soluble polymer is added to the solution of Trypan Blue prior to the cooling step (a), during the filtration step (b), or after the filtration step (b).

14. The method of claim 13, wherein the water-soluble polymer is selected from the group of: poly(acrylic acid) or a salt thereof, poly(styrene sulfonate) or a salt thereof, poly(vinyl pyrrolidone), or any combinations thereof.

15. The method of claim 13, further comprising filtering the Trypan Blue solution before or after adding the water-soluble polymer.

16. The method of claim 1, further comprising, after cooling step (a) and before filtering step (b), mixing the solution for at least 1 hour, or for at least 3 hours, or for at least 6 hours, or for at least 12 hours at a temperature of less than 15° C.

17. The method of claim 1, wherein steps (a) and (b) are at a temperature of less than 5° C.

18. The method of claim 1, wherein steps (a) and (b) are at a temperature of between 0° C. and 14° C.

19. The method of claim 1, further comprising, after cooling step (a) and before filtering step (b), mixing the solution for at least 1 hour at a temperature of less 15° C.;

and adding sodium azide preserved phosphate buffered saline to the solution at a temperature of less than 15° C.

* * * * *